United States Patent
Fan et al.

(10) Patent No.: US 9,621,326 B2
(45) Date of Patent: Apr. 11, 2017

(54) METHODS AND DEVICES FOR RANDOM ACCESS

(71) Applicant: Telefonaktiebolaget L M Ericsson (publ), Stockholm (SE)

(72) Inventors: Rui Fan, Beijing (CN); Erik Eriksson, Linköping (SE); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/387,581

(22) PCT Filed: Aug. 8, 2014

(86) PCT No.: PCT/CN2014/084043
§ 371 (c)(1),
(2) Date: Sep. 24, 2014

(87) PCT Pub. No.: WO2015/018371
PCT Pub. Date: Feb. 12, 2015

(65) Prior Publication Data
US 2016/0164657 A1 Jun. 9, 2016

(30) Foreign Application Priority Data
Aug. 8, 2013 (WO) ................ PCT/CN2013/081114

(51) Int. Cl.
*H04J 3/00* (2006.01)
*H04L 5/14* (2006.01)
(Continued)

(52) U.S. Cl.
CPC ............. *H04L 5/14* (2013.01); *H04W 56/001* (2013.01); *H04W 74/006* (2013.01); *H04W 74/0833* (2013.01)

(58) Field of Classification Search
None
See application file for complete search history.

(56) References Cited

U.S. PATENT DOCUMENTS

| 2010/0322118 | A1 | 12/2010 | Fang et al. | |
|---|---|---|---|---|
| 2011/0211522 | A1* | 9/2011 | Chung | H04L 1/1822 370/315 |

(Continued)

FOREIGN PATENT DOCUMENTS

| CN | 102215534 | 10/2011 |
|---|---|---|
| EP | 3 001 747 | 3/2016 |

(Continued)

OTHER PUBLICATIONS

PCT Notification of Transmittal of the International Search Report and the Written Opinion of the International Searching Authority, or the Declaration for International application No. PCT/CN2013/081114, May 14, 2014.

(Continued)

*Primary Examiner* — Duc C Ho
(74) *Attorney, Agent, or Firm* — Baker Botts, LLP

(57) ABSTRACT

One embodiment of the present disclosure relates to a method for random access in a UE in an out-of sync status. The method comprises: sending to a base station a first message including a random access preamble according to a TDD configuration in a SIB; receiving from the base station a second message including a random access response using the random access preamble according to the TDD configuration in the SIB. Another embodiment of the present invention also relates to corresponding method for random access in a base station. According to an aspect of the present disclosure, there are provided corresponding devices.

17 Claims, 11 Drawing Sheets

(51) Int. Cl.
*H04W 74/00* (2009.01)
*H04W 74/08* (2009.01)
*H04W 56/00* (2009.01)

(56) References Cited

U.S. PATENT DOCUMENTS

| | | | |
|---|---|---|---|
| 2012/0063302 A1* | 3/2012 | Damnjanovic | ... H04W 56/0045 370/228 |
| 2012/0082099 A1 | 4/2012 | Bienas et al. | |
| 2012/0320806 A1 | 12/2012 | Ji et al. | |
| 2013/0028204 A1 | 1/2013 | Dinan | |
| 2013/0301492 A1* | 11/2013 | Ji | ............................ H04L 5/14 370/280 |
| 2014/0112254 A1* | 4/2014 | Lindoff | ............... H04W 74/002 370/328 |
| 2014/0204783 A1* | 7/2014 | Lin | ....................... H04W 24/02 370/252 |
| 2014/0233530 A1* | 8/2014 | Damnjanovic | ....... H04W 48/12 370/331 |
| 2015/0016312 A1* | 1/2015 | Li | .................... H04W 74/0833 370/280 |
| 2015/0295743 A1* | 10/2015 | Hwang | ................ H04W 48/12 370/280 |

FOREIGN PATENT DOCUMENTS

| | | |
|---|---|---|
| RU | 2 419 227 C2 | 5/2011 |
| WO | WO 2011/026377 | 3/2011 |
| WO | WO 2012/109195 | 2/2012 |
| WO | WO 2012/083811 | 6/2012 |
| WO | WO 2012/174216 | 12/2012 |
| WO | WO 2013/026184 | 2/2013 |
| WO | WO 2013/112952 | 8/2013 |

OTHER PUBLICATIONS

PCT Notification of Transmittal of the International Search Report and the Written Opinion of the International Searching Authority, or the Declaration for International Application No. PCT/CN2014/084043, Nov. 2, 2014.
PCT Notification of Transmittal of International Preliminary Report on Patentability for International application No. PCT/CN2014/084043, Dec. 16, 2015.
3rd Generation Partnership Project; Technical Specification Group Radio Access Network; Evolved Universal Terrestrial Radio Access (E-UTRA); Medium Access Control (MAC) protocol specification (Release 11), 2014.
3rd Generation Partnership Project; Technical Specification Group Radio Access Network; Evolved Universal Terrestrial Radio Access (E-UTRA); Physical layer procedures (Release 11), 2014.
Office Action received from Russian Federation for Application No. 2016107911/20(012499)—Mar. 4, 2016.
P41240RU1 Feb. 7, 2017 Search Report.
3GPP TSG-RAN WG1 Meeting #69; Prague, Czech Republic; Title: Discussion on Enhancements for Dynamic TDD UL-DL Configuration; Source: Renesas Mobile Europe Ltd (R1-122363)—May 21-25, 2012.
3GPP TSG-RAN1 #72 Meeting; St. Julian's, Malta; Title: Support for legacy UEs in adaptive TDD System; Source: MediaTek Inc. (R1-130217)—Jan. 28-Feb. 2, 2012.
Extended European Search Report for Application No. EP 14 83 4704—Feb. 27, 2017.

* cited by examiner

METHODS AND DEVICES FOR RANDOM ACCESS

PRIORITY

This nonprovisional application is a U.S. National Stage Filing under 35 U.S.C. §371 of International Patent Application Serial No. PCT/CN2014/084043, filed Aug. 8, 2014, and entitled "Methods and Devices For Random Access" and International Patent Application Serial No. PCT/CN2013/081114, filed Aug. 8, 2013.

TECHNICAL FIELD

The present disclosure generally relate to wireless communication, particularly to methods and devices for random access.

BACKGROUND

With the development of Long Term Evolution (LTE) or Advanced Long Term Evolution (LTE-A), a new feature called dynamic Time Division Duplex (TDD) is proposed.

For communication devices, such as user equipments, which are capable of operating in the dynamic TDD mode, it may be assigned more than one TDD configurations. This may bring a problem in some communication situations in determining by a communication party (e.g. a user equipment or a base station) which TDD configuration is currently used by the other communication party (e.g. a base station or a user equipment).

SUMMARY

One or more method and apparatus embodiments according to the present disclosure aim to provide a communication solution for a communication device that may be operated in the dynamic TDD scenario.

According to an aspect of the present disclosure, there is provided a method for operating a communication device. According to an embodiment of the present disclosure, the method comprises: sending to a network device a first message including a random access preamble according to a TDD configuration in a system information block (SIB); receiving from the network node device a second message including a random access response using the random access preamble according to the TDD configuration in the SIB.

According to an aspect of the present disclosure, there is provided a method for operating a network node device. According to an embodiment of the present disclosure, the method comprises: receiving from a communication device a first message including a random access preamble according to a TDD configuration in a SIB; sending to the communication device a second message including a random access response using the random access preamble according to the TDD configuration in the SIB.

According to an aspect of the present disclosure, there is provided a communication device. According to an embodiment of the present disclosure, the communication device comprises: a sending unit configured to send to a network node device a first message including a random access preamble according to a Time Division Duplex, TDD, configuration in a SIB; and a receiving unit configured to receive from the network node device a second message including a random access response using the random access preamble according to the TDD configuration in the SIB.

According to an aspect of the present disclosure, there is provided a network node device. According to an embodiment of the present disclosure, the network node device comprises: a receiving unit configured to receive from a communication device a first message including a random access preamble according to a TDD configuration in a SIB; and a sending unit configured to send to the communication device a second message including a random access response using the random access preamble according to the TDD configuration in the SIB.

According to another aspect of the present disclosure, there is provided a method for operating a communication device. According to an embodiment of the present disclosure, the method comprises: determining whether an explicit signaling indicative of a TDD configuration is received; selecting a random access preamble based on a result of the determination; sending to a network node device a first message for a random access procedure including the random access preamble according to a TDD configuration in a SIB; performing subsequent messaging for the random access procedure according to a TDD configuration determined based on the result of the determination. The communication device may be in an out-of-sync status.

According to an embodiment of the present disclosure, in a contention-based random access procedure, the step of selecting a random access preamble may comprise: selecting a random access preamble which belongs to a predefined subset of available random access preambles in a cell, in response to determining that the explicit signaling is received; and selecting a random access preamble which does not belong to the predefined subset of available random access preambles in the cell, in response to determining that the explicit signaling is not received.

According to an embodiment of the present invention, the step of performing subsequent messaging for the random access procedure may comprise: performing, in response to determining that the explicit signaling is received, subsequent messaging for the random access procedure according to the TDD configuration indicated by the explicit signaling; and performing, in response to determining that the explicit signaling is not received, subsequent messaging for the random access procedure according to the TDD configuration in the system information block.

According to an embodiment of the present invention, in a contention-free random access procedure, the explicit signaling may be configured to be transmitted with a random access preamble assigned to the communication device in a same message to the communication device. In response to determining that the explicit signaling is received, the step of selecting a random access preamble may comprise selecting the random access preamble assigned to the communication device, and the step of performing subsequent messaging for the random access procedure may comprise: performing subsequent messaging for the random access procedure according to the TDD configuration indicated by the explicit signaling.

According to an embodiment of the present invention, the communication device may be a user equipment.

According to an embodiment of the present invention, the user equipment may be in an out-of-sync status.

According to another aspect of the present disclosure, there is provided a method for operating a network node device. According to an embodiment of the present invention, the method comprises: sending to a communication device an explicit signaling indicative of a TDD configuration; receiving from the communication device a first message for a random access procedure including a random access preamble according to a TDD configuration in a SIB; determining, based on the random access preamble, whether the explicit signaling is received by the communication device; performing subsequent messaging for the random access procedure according to a TDD configuration determined based on the result of the determination.

According to an embodiment of the present disclosure, in a contention-based random access procedure, the step of determining, based on the random access preamble, whether the explicit signaling is received by the communication device may comprise: determining, if the random access preamble belongs to a predefined subset of available random access preambles in a cell, that the explicit signaling is received by the communication device; determining, if the random access preamble does not belong to the predefined subset of available random access preambles in the cell, that the explicit signaling is not received by the communication device.

According to an embodiment of the present disclosure, the step of performing subsequent messaging for the random access procedure may comprise: performing, in response to determining that the explicit signaling is received by the communication device, subsequent messaging for the random access procedure according to the TDD configuration indicated by the explicit signaling; and performing, in response to determining that the explicit signaling is not received by the communication device, subsequent messaging for the random access procedure according to the TDD configuration in the system information block.

According to an embodiment of the present disclosure, in a contention-free random access procedure, the explicit signaling may be configured to be transmitted with a random access preamble assigned to the communication device in a message to the communication device. The step of determining, based on the random access preamble, whether the explicit signaling is received by the communication device may comprise: determining, if the random access preamble is the random access preamble assigned to the communication device, that the explicit signaling is received by the communication device. The step of performing subsequent messaging for the random access procedure may comprise: performing, in response to determining that the explicit signaling is received by the communication device, subsequent messaging for the random access procedure according to the TDD configuration indicated by the explicit signaling.

According to an embodiment of the present disclosure, the network node device may be a base station.

According to an embodiment of the present disclosure, the method may be used for random access.

According to another aspect of the present disclosure, there is provided a communication device. According to an embodiment of the present disclosure, the communication device may comprise: a receiving unit configured to receive messages from a network node device; a determining unit configured to determine whether an explicit signaling indicative of a TDD configuration is received by the receiving unit; a selecting unit configured to select a random access preamble based on a result of the determination; a sending unit configured to send to a network node device a first message for a random access procedure including the random access preamble according to a TDD configuration in a SIB. The sending unit and the receiving unit may be configured to perform subsequent messaging for the random access procedure according to a TDD configuration determined based on the result of the determination.

According to an embodiment of the present disclosure, in a contention-based random access procedure, the selecting unit may be configured to select a random access preamble which belongs to a predefined subset of available random access preambles in a cell, in response to determining by the determining unit that the explicit signaling is received by the receiving unit; and select a random access preamble which does not belong to the predefined subset of available random access preambles in the cell, in response to determining by the determining unit that the explicit signaling is not received by the receiving unit.

According to an embodiment of the present disclosure, the sending unit and the receiving unit may be configured to perform, in response to determining by the determining unit that the explicit signaling is received by the receiving unit, subsequent messaging for the random access procedure according to the TDD configuration indicated by the explicit signaling; and perform, in response to determining by the determining unit that the explicit signaling is not received by the receiving unit, subsequent messaging for the random access procedure according to the TDD configuration in the system information block.

According to an embodiment of the present disclosure, in a contention-free random access procedure, the explicit signaling may be configured to be transmitted with a random access preamble assigned to the communication device in a same message to the communication device. In response to determining by the determining unit that the explicit signaling is received by the receiving unit, the selecting unit may be configured to select the random access preamble assigned to the communication device, and the sending unit and the receiving unit may be configured to perform subsequent messaging for the random access procedure according to the TDD configuration indicated by the explicit signaling.

According to an embodiment of the present disclosure, the communication device may be a user equipment.

According to an aspect of the present disclosure, the user equipment may be in an out-of-sync status.

According to another aspect of the present disclosure, there is provided a network node device. According to an embodiment of the present disclosure, the network node device comprises: a sending unit configured to send to a communication device an explicit signaling indicative of a TDD configuration; a receiving unit configured to receive from the communication device a first message for a random access procedure including a random access preamble according to a TDD configuration in a SIB; a determining unit configured to determine, based on the random access preamble, whether the explicit signaling is received by the out-of-sync communication device The sending unit and the receiving unit are configured to perform subsequent messaging for the random access procedure according to a TDD configuration determined based on the result of the determination.

According to an embodiment of the present disclosure, in a contention-based random access procedure, the determining unit may be configured to determine, if the random access preamble belongs to a predefined subset of available random access preambles in a cell, that the explicit signaling is received by the communication device; determine, if the random access preamble does not belong to the predefined subset of available random access preambles in the cell, that the explicit signaling is not received by the communication device.

According to an embodiment of the present disclosure, the sending unit and the receiving unit may be configured to perform, in response to determining by the determining unit that the explicit signaling is received by the communication device, subsequent messaging for the random access procedure according to the TDD configuration indicated by the explicit signaling; and perform, in response to determining by the determining unit that the explicit signaling is not received by the communication device, subsequent messaging for the random access procedure according to the TDD configuration in the system information block.

According to an embodiment of the present disclosure, in a contention-free random access procedure, the explicit signaling may be configured to be transmitted with a random access preamble assigned to the communication device in a same message to the communication device. The determining unit may be configured to determine, if the random access preamble is the random access preamble assigned to the communication device, that the explicit signaling is received by the communication device. The sending unit and the receiving unit may be configured to perform, in response to determining that the explicit signaling is received by the communication device, subsequent messaging for the random access procedure according to the TDD configuration indicated by the explicit signaling.

According to an embodiment of the present disclosure, the network node device may be a base station.

According to an aspect of the present disclosure, there provides a communication device. According to an embodiment of the present disclosure, the communication device comprises a processing means adapted to send to a network node device a first message including a random access preamble according to a Time Division Duplex, TDD, configuration in a system information block; and receive from the network node device a second message including a random access response using the random access preamble, according to the TDD configuration in the system information block. According to an embodiment of the present disclosure, the processing means may comprise a processor and a memory and the memory may contain instructions executable by the processor.

According to another aspect of the present disclosure, there provides a network node device. According to an embodiment of the present disclosure, the network node device comprises a processing means adapted to receive from a communication device a first message including a random access preamble according to a TDD configuration in a system information block; and send to the communication device a second message including a random access response using the random access preamble according to the TDD configuration in the system information block. According to an embodiment of the present disclosure, the processing means may comprise a processor and a memory and the memory may contain instructions executable by the processor.

According to another aspect of the present disclosure, there provides a communication device. According to an embodiment of the present disclosure, the communication device comprises a processing means adapted to determine whether an explicit signaling indicative of a TDD configuration is received; select a random access preamble based on a result of the determination; send to a network node device a first message for a random access procedure including the random access preamble according to a TDD configuration in a system information block; perform subsequent messaging for the random access procedure according to a TDD configuration determined based on the result of the determination. According to an embodiment of the present disclosure, the processing means may comprise a processor and a memory and the memory may contain instructions executable by the processor.

According to another aspect of the present disclosure, there provides a network node device. According to an embodiment of the present disclosure, the network node device comprises a processing means adapted to send to an communication device an explicit signaling indicative of a TDD configuration; receive from the communication device a first message for a random access procedure including a random access preamble according to a TDD configuration broadcasted in a system information block; determine, based on the random access preamble, whether the explicit signaling is received by the communication device; perform subsequent messaging for the random access procedure according to a TDD configuration determined based on the result of the determination. According to an embodiment of the present disclosure, the processing means may comprise a processor and a memory and the memory may contain instructions executable by the processor.

According to another aspect of the present disclosure, there provides a method for operating a network node device, which serves a communication device over at least one secondary cell in carrier aggregation. The method comprises sending to the communication device a RRC signaling according to a TDD configuration in a system information block, so as to instruct the communication device to enable a dynamic TDD capable mode; receiving from the communication device a confirmation indication according to the TDD configuration in the system information block, that the communication device receives the RRC signaling; communicating with the communication device over the at least one secondary cell according to the dynamic TDD capable mode.

According to another aspect of the present disclosure, there provides a method for operating a communication device, which is served by a network node device over at least one secondary cell in carrier aggregation. The method comprises receiving from the network node device a RRC signaling according to a TDD configuration in a system information block, wherein the RRC signaling instructs the communication device to enable a dynamic TDD capable mode; sending to the network node device a confirmation indication according to the TDD configuration in the system information block, to indicate that the communication device receives the RRC signaling; determining whether the network node device receives the confirmation indication or not; in response to determining that the network node device receives the confirmation indication, communicating with the network node device over the at least one secondary cell according to the dynamic TDD capable mode; and in response to determining that the network node device does not receive the confirmation indication, communicating with the network node device over at least one secondary cell according to the TDD configuration in the system information block.

According to another aspect of the present disclosure, there provides a network node device, which serves a communication device over at least one secondary cell in carrier aggregation. The network node device comprises a sending unit configured to send the communication device a RRC signaling according to a TDD configuration in a system information block, so as to instruct the communication device to enable the dynamic TDD capable mode; a receiving unit configured to receive from the communication device a confirmation indication according to the TDD configuration in the system information block, that the communication device receives the RRC signaling; a controlling unit configured to control the sending unit and the receiving unit to communicate with the communication device over the at least one secondary cell according to the dynamic TDD capable mode.

According to another aspect of the present disclosure, there provides a communication device, which is served by a network node device over at least one secondary cell in carrier aggregation. The communication device comprises a receiving unit configured to receive from a network node device a RRC signaling according to a TDD configuration in a system information block, wherein the RRC signaling instructs the communication device to enable a dynamic TDD capable mode; a sending unit configured to send to the network node device a confirmation indication according to the TDD configuration in the system information block, to indicate that the communication device receives the RRC signaling; a determining unit configured to determine whether the network node device receives the confirmation indication or not; a controlling unit configured to in response to determining that the network node device receives the confirmation indication, control the receiving unit and the sending unit to communicate with the network node device over the at least one secondary cell according to the dynamic TDD capable mode; and in response to determining that the network node device does not receive the confirmation indication, control the receiving unit and the sending unit to communicate with the network node device over at least one secondary cell according to the TDD configuration in the system information block.

According to another aspect of the present disclosure, there provides a network node device. According to an embodiment of the present disclosure, the network node device comprises a processing means adapted to send to the communication device a RRC signaling according to a TDD configuration in a system information block, so as to instruct the communication device to enable a dynamic TDD capable mode; receive from the communication device a confirmation indication according to the TDD configuration in the system information block, that the communication device receives the RRC signaling; communicate with the communication device over the at least one secondary cell according to the dynamic TDD capable mode. According to an embodiment of the present disclosure, the processing means may comprise a processor and a memory and the memory may contain instructions executable by the processor.

According to another aspect of the present disclosure, there provides a network node device. According to an embodiment of the present disclosure, the network node device comprises a processing means adapted to receive from the network node device a RRC signaling according to a TDD configuration in a system information block, wherein the RRC signaling instructs the communication device to enable a dynamic TDD capable mode; send to the network node device a confirmation indication according to the TDD configuration in the system information block, to indicate that the communication device receives the RRC signaling; determining whether the network node device receives the confirmation indication or not; in response to determining that the network node device receives the confirmation indication, communicate with the network node device over the at least one secondary cell according to the dynamic TDD capable mode; and in response to determining that the network node device does not receive the confirmation indication, communicate with the network node device over at least one secondary cell according to the TDD configuration in the system information block. According to an embodiment of the present disclosure, the processing means may comprise a processor and a memory and the memory may contain instructions executable by the processor.

According to one or more embodiments of the present disclosure, when a UE in an out-of-sync and/or link failure status initiates a random access procedure in the dynamic TDD scenario, the UE and corresponding base station (e.g. an evolved Node B) can use consistent TDD configuration in messaging for the random access procedure and thus random access failure of such UEs in the dynamic TDD scenario can be significantly reduced.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Figure 1A:
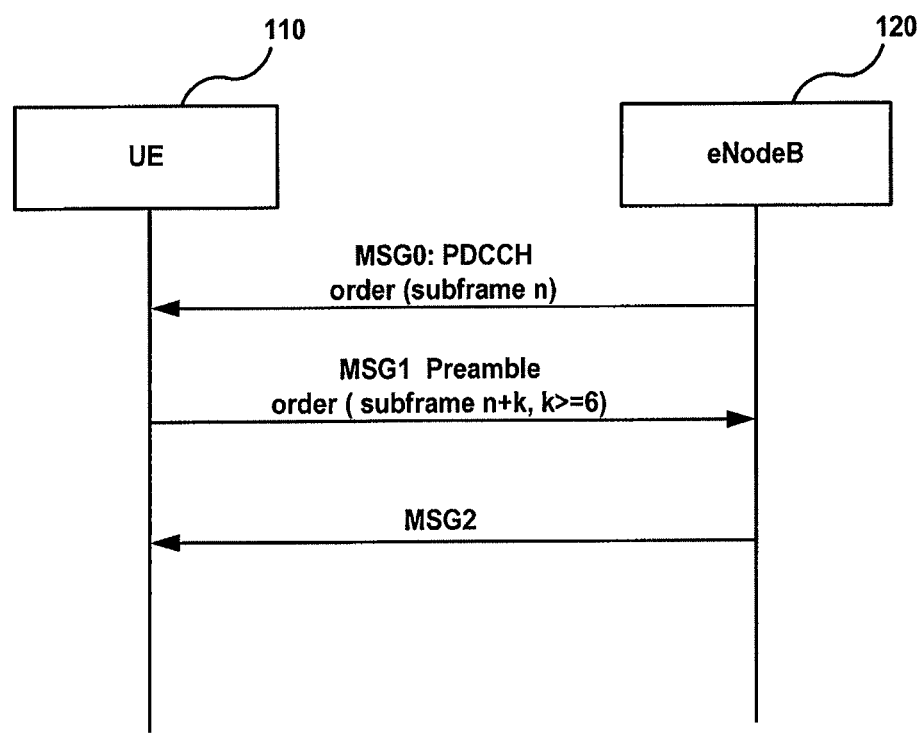
FIG. 1A is a diagram schematically illustrating a contention-free random access procedure.

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of LTE or LTE-A type wireless communication system for illustrative purposes, those skilled in the art will recognize that one or more embodiments of the present disclosure can also be applied to various other types of wireless communication systems. Thus, the following aspects, features, embodiments and advantages are only for illustrative purposes, and should not be understood as elements or limitations of the appended claims, unless otherwise explicitly specified in the claims.

According to dynamic TDD technology, the TDD configuration(s) of a cell can be changed dynamically according to the instantaneous traffic in the cell. TDD allows for different asymmetries in terms of the amount of resources allocated for uplink and downlink transmission, respectively, by means of different downlink/uplink configurations. Taking Long Term Evolution (LTE) for example, there are seven different TDD configurations specified in Table 4.2-2 of 3GPP standard 36.211 v8.4.0. If there is more downlink traffic in a cell, the TDD configuration can be configured to a TDD configuration that supports heavier downlink traffic (also referred as to a downlink heavier configuration); and if there is more uplink traffic in the cell, the TDD configuration can be configured to a TDD configuration that supports heavier uplink traffic (also referred as to an uplink heavier configuration). Dynamic TDD feature can be enabled, while a user equipment (UE) acquires two TDD configurations from a base station such as an evolved-NodeB (eNodeB). One is an uplink heavier TDD configuration broadcasted in a System Information Block (SIB), the other is a downlink heavier TDD configuration which is informed to the UE via dedicated Radio Resource Control (RRC) signaling when UE first attach to the network. All possible TDD configurations that can be applied in the communication between the UE and the eNodeB are determined by the uplink heavier TDD configuration broadcasted in the SIB and the downlink heavier TDD configuration informed via the dedicated RRC signaling. Each of those determined TDD configurations configures uplink subframes that belong to a subset of uplink subframes of the uplink heavier TDD configuration of the SIB and downlink subframes that belong to a subset of downlink subframes of the downlink heavier TDD configuration of dedicated Resource Control signaling.

However, since in a dynamic TDD scenario, multiple TDD configurations can be used between UE and eNodeB, a UE, which has been assigned more than one TDD configurations but currently is in an out-of-sync or link-failure status, may initiate a random access procedure according to any one of those TDD configurations. However, eNodeB does not know which TDD configuration is actually used by UE to perform messaging for the random access procedure. The inconsistence in TDD configuration between UE and eNodeB will result in random access failure.

The term "out-of-sync" mentioned in the present disclosure indicates a communication device status when uplink (UL) timing alignment is not maintained. For example, an information element TimeAlignmentTimer is used to control how long the communication device considers the serving cells to be uplink time aligned as defined in 3GPP TS 36.331 v12.0.0. When the timer expires, the communication device will be deemed to be unsynchronized in uplink and a random access procedure is needed to reacquire uplink timing.

The term "link failure" mentioned in the present disclosure also indicates a communication device status. If the downlink radio quality falls below a given threshold, the communication device will indicate out-of-sync to higher layers. If the communication device detects that the out-of-sync status lasts for a certain period, a Radio Link Failure (RLF) occurs and the communication needs to re-establish the RRC connection via a random access procedure.

Therefore, there is need to provide a communication solution facilitating a random access, for example, for an out-of-sync and/or link-failure communication device that may be operated in the dynamic TDD scenario.

FIG. 1A is a diagram schematically illustrating a contention-free random access procedure in the prior art.

In a contention-free random access procedure, an eNodeB 120 sends to a UE 110 a message (MSG0) for random access preamble assignment via a physical downlink control channel (PDCCH), which includes a random access preamble assigned to UE 110. The UE 110 has been connected to the network but being out-of-sync in this example. The UE 110 retrieves the random access preamble from received MSG0 and sends it to the eNodeB 120 in a first message (MSG1) of a random access request. The eNodeB 120 monitors a selected uplink channel to receive MSG1 Upon receipt of MSG1, the eNodeB 120 sends to the UE 110 a second message (MSG2) including a random access response via the downlink shared channel (DL-SCH) to acknowledge the successfully detected preamble. Then the eNodeB 120 and UE 110 are thereby aligned in the time domain.

Figure 1B:
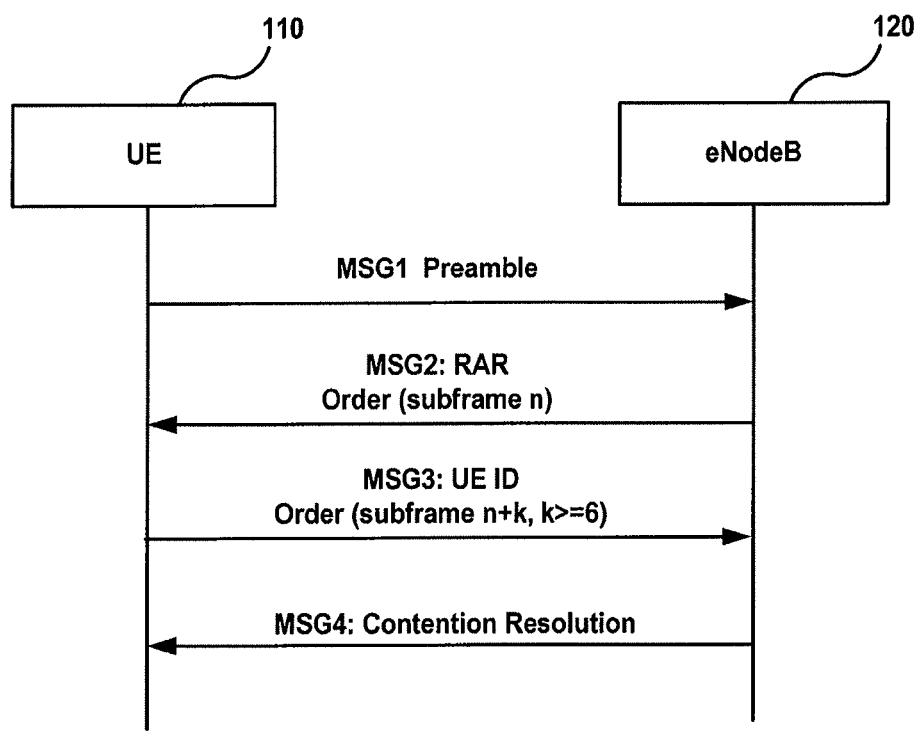
FIG. 1B a diagram schematically illustrating a contention-based random access procedure.

FIG. 1B a diagram schematically illustrating a contention-based random access procedure in the prior art.

In a contention-based random access procedure, the UE 110 initiates the random procedure by sending a first message (MSG1) including a random access preamble selected from all of preambles available in the cell in a selected uplink channel. The eNodeB 120 monitors the uplink channel to detect the preamble. The eNodeB 120 sends a second message (MSG2) including a random access response to acknowledge the successfully detected preamble. If the UE 110 receives MSG2, then the UE 110 will send to the eNodeB 120 a third message (MSG3) including an identifier specific to the UE 110. Then, the UE 110 monitors a specified downlink channel for response from the eNodeB 120. The eNodeB 120 attempts to resolve any contentions and sends to the UE 110 a fourth message (MSG4) including a contention resolution.

According to the 3GPP specification TS 36.213 V11.4.0, the uplink timing requirement of random access procedure is described as follows:

For the Layer 1 random access procedure, UE's uplink transmission timing after a random access preamble transmission is as follows.

a. If a PDCCH (physical downlink control channel) with associated radio access Radio Network Temporary Identifier (RA-RNTI) is detected in subframe n, and the corresponding DL-SCH transport block contains a response to the transmitted preamble sequence, the UE shall, according to the information in the response, transmit an UL-SCH transport block in the first subframe $n+k_1$, $k_1 \geq 6$, if the UL delay field is set to zero where $n+k_1$ is the first available UL subframe for PUSCH transmission. The UE shall postpone the PUSCH transmission to the next available UL subframe after $n+k_1$ if the field is set to 1.

b. If a random access response is received in subframe n, and the corresponding DL-SCH transport block does not contain a response to the transmitted preamble sequence, the UE shall, if requested by higher layers, be ready to transmit a new preamble sequence no later than in subframe n+5.

c. If no random access response is received in subframe n, where subframe n is the last subframe of the random access response window, the UE shall, if requested by higher layers, be ready to transmit a new preamble sequence no later than in subframe n+4.

In case a random access procedure is initiated by a "PDCCH order" in subframe n (i.e. a contention free random access), the UE shall, if requested by higher layers, transmit random access preamble in the first subframe n+$k_2$, $k_2 \geq 6$, where a PRACH (Packet Random Access Channel) resource is available.

Thus, it can be seen that both MSG1 in contention-free random access and MSG3 in contention-based random access have strict timing requirement.

According to the 3GPP specification TS 36.321 V11.2.0, the downlink timing requirement of random access procedure is described as follows:

Once the Random Access Preamble is transmitted and regardless of the possible occurrence of a measurement gap, the UE shall monitor the PDCCH of the PCell (Primary cell) for Random Access Response(s) identified by the RA-RNTI defined below, in the RA Response window which starts at the subframe that contains the end of the preamble transmission plus three subframes and has length ra-ResponseWindowSize subframes Thus, it can be seen that the reception of MSG2 also has timing requirement.

According to an example of the present disclosure, the transmission/reception of MSG1 follows the TDD configuration in SIB, and then the transmission/reception of MSG1 at the eNodeB 120 and the UE 110 can be aligned. On the other hand, the transmission/reception of MSG2/3/4 may still have ambiguity issue, as the UE 110/eNodeB 120 may transmit/receive MSG2/3/4 according to any of the possible TDD configurations in the dynamic TDD scenario, which may not be known by its peer. Even if an explicit signaling is used to notify the UE 110 which TDD configuration the eNodeB 120 is going to use, the eNodeB 120 still cannot know whether the UE 110 who initiate random access detects that explicit signaling or not, because the UE 110 may be either in active time or in sleep time, if it is out-of-sync.

Embodiments of the present disclosure intend to eliminate such TDD configuration ambiguity at least in random access procedure between a network node device such as eNodeB and a communication device such as a UE, which has already been assigned more than one TDD configurations, so that the communication device/network node device can know which TDD configuration is used in messaging of random access by its peer.

In the present disclosure, a communication devices also known as mobile terminals, wireless terminals and/or User Equipment (UE) are enabled to communicate wirelessly with a network node in a wireless communication system, sometimes also referred to as a cellular radio system. For instance, a communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The [terminal device/communication device] may be a portable, pocket-storable, hand-held, computer-comprised, or vehicle-mounted mobile device, enabled to communicate voice and/or data, via a wireless or wireline connection.

Typically, a network node device may serve or cover one or several cells of the wireless communication system. That is, the network node device provides radio coverage in the cell(s) and communicates over an air interface with communication devices operating on radio frequencies within its range. The network node device in some wireless communication systems may be also referred to as "eNB", "eNodeB", "NodeB" or "B node", depending on the technology and terminology used. In the present disclosure, the network node device may also be referred to as a Base Station (BS). The network node devices may be of different classes such as e.g. macro eNodeB, home eNodeB or pico base station, or relay node, based on transmission power and thereby also cell size.

Solution 1

With reference to FIGS. 2-5, various embodiments of solution 1 of the present disclosure are described in detail.

Figure 2:
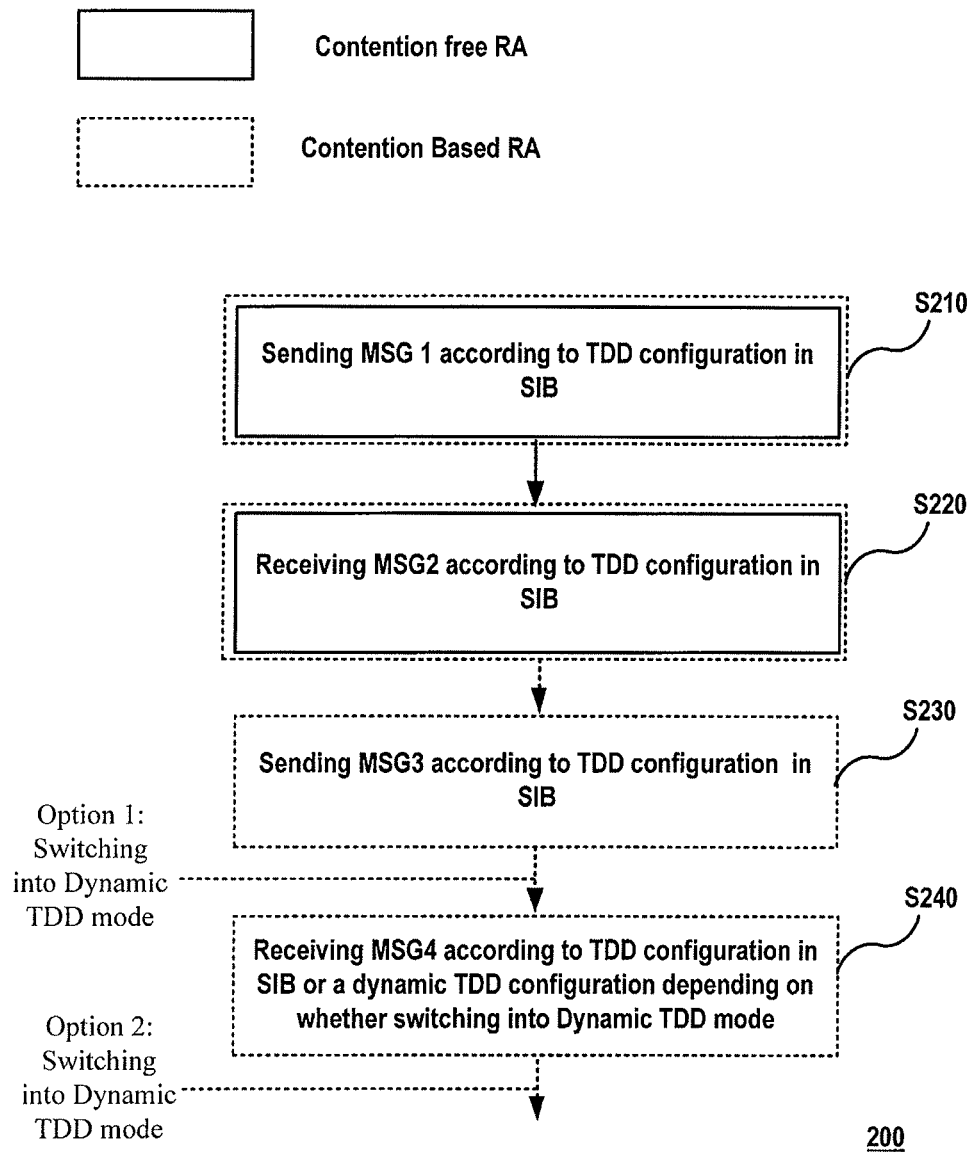
FIG. 2 schematically illustrates an exemplary flow chart of a method for operating a communication device according to one or more embodiments of the present disclosure.

FIG. 2 schematically illustrates an exemplary flow chart of a method 200 for operating a communication device according to one or more embodiments of the present disclosure.

The communication device may be in an out of sync or link-failure status, so it needs to initiate a random access procedure with a network node device such as eNodeB. The communication device may have been assigned more than one TDD configurations before the initiation of the random access procedure. Those previously assigned TDD configurations may include the TDD configuration in the SIB and at least another TDD configuration informed via dedicated Radio Resource Control signaling by the eNodeB.

As shown in FIG. 2, in block S210, an communication device such as the UE 110 as shown in FIGS. 1A and 1B sends to a network node device such as the eNodeB 120 as shown in FIGS. 1A and 1B a first message (MSG1) including a random access preamble according to a TDD configuration in the SIB.

In block S220, the communication device receives from the network node device a second message (MSG2) including a random access response using the random access preamble according to the TDD configuration in the SIB. In a contention-free random access procedure, the communication device and network node device can be thereby aligned in the time domain in this block.

According to one or more embodiments regarding a contention-based random access procedure, the method 200 may further proceed with blocks S230-S240.

In block S230, the communication device may send to the network node device a third message (MSG3) including an identifier specific to the communication device according to the TDD configuration in the SIB.

In block S240, the communication device may receive a fourth message (MSG4) according to the TDD configuration in the SIB or a dynamic TDD configuration depending on whether the communication device and base station switch into the dynamic TDD capable mode.

According to an embodiment of the present disclosure, as an option, the communication device may be switched into the dynamic TDD capable mode to support multiple dynamic TDD configurations, after sending MSG3 in block S230. During the switching procedure, the communication device may be configured by a RRC signaling received from the network node device to switch into the dynamic TDD capable mode. In this embodiment, the communication device may receive in block S240 from the network node device MSG4 including a contention resolution by monitoring downlink channels according to the multiple dynamic TDD configurations. In particular, the communication device will monitor all the downlink channels allowed by the multiple dynamic TDD configurations to receive MSG4.

According to an embodiment of the present disclosure, as another option, the communication device may be switched into the dynamic TDD capable mode to support multiple dynamic TDD configurations, after the UE receives MSG4 in block S240. During the switching procedure, the communication device may be configured by a RRC signaling received from the network node device to switch into the dynamic TDD capable mode. In this embodiment, in block S240, the UE may be configured to receive MSG4 according to the TDD configuration in the SIB.

According to embodiments of the present disclosure, each of the multiple dynamic TDD configurations may have uplink subframes that belong to a subset of uplink subframes of TDD configuration in the system information block and downlink subframes that belong to a subset of downlink subframes of the TDD configuration informed via dedicated Radio Resource Control signaling, which has been already assigned to the communication device by the network node device.

Figure 3:
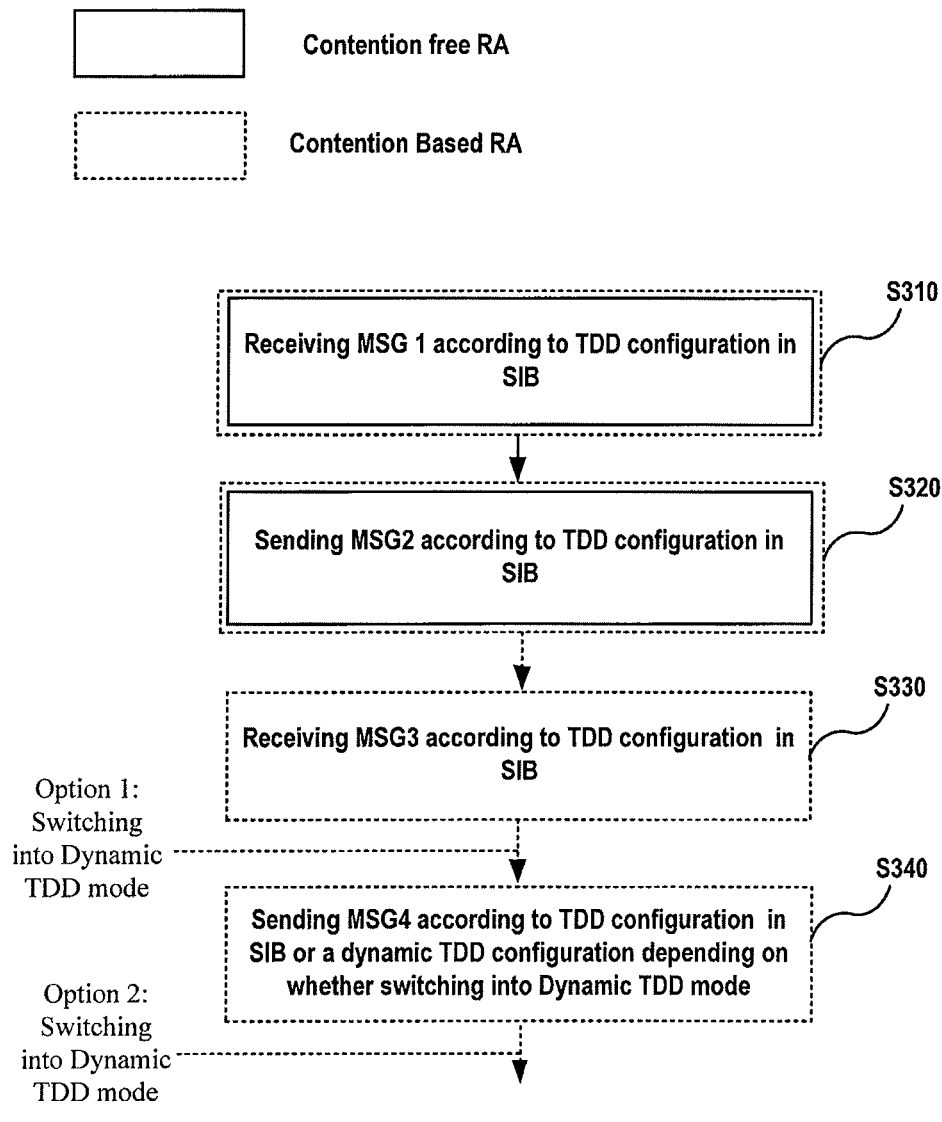
FIG. 3 schematically illustrates an exemplary flow chart of a method for operating a network node device according to one or more embodiments of the present disclosure.

FIG. 3 schematically illustrates an exemplary flow chart of a method 300 for operating a network node device according to one or more embodiments of the present disclosure.

The network node device may be a base station such as the eNodeB 120 as shown in FIGS. 1A and 1B.

As shown in FIG. 3, in block S310, the network node device receives from a communication device such as the UE 110 as shown in FIGS. 1A and 1B a first message (MSG1) including a random access preamble according to a TDD configuration in the SIB. The communication device may be in an out of sync or link-failure status, so it needs to initiate a random access procedure with the network node device such as eNodeB. The network node device may have assigned to the communication device more than one TDD configurations before the initiation of the random access procedure. Those previously assigned TDD configurations may include the TDD configuration in the SIB and at least another TDD configuration informed via dedicated Radio Resource Control signaling.

In block S320, the network node device sends to the communication device a second message (MSG2) including a random access response using the random access preamble according to the TDD configuration in the SIB. In a contention-free random access procedure, the network node device and communication device can be thereby aligned in the time domain in this block.

According to one or more embodiments regarding a contention-based random access procedure, the method 300 may further proceed with blocks S330-S340.

In block S330, the network node device may receive from the communication device a third message (MSG3) including an identifier specific to the communication device according to the TDD configuration in the SIB.

In block S340, the network node device may send a fourth message (MSG4) according to the TDD configuration in the SIB or a dynamic TDD configuration depending on whether the communication device and network node device are switched into the dynamic TDD capable mode.

According to an embodiment of the present disclosure, as an option, the network node device may switch into the dynamic TDD capable mode, so as to support multiple dynamic TDD configurations, after receiving MSG3 in block S330. In the switching procedure, the network node device may also configure the communication device to switch into the dynamic TDD capable mode for example via a RRC signaling. In this embodiment, the network node device may send in block S340 to the communication device MSG4 including a contention resolution according to one of the multiple dynamic TDD configurations.

According to an embodiment of the present disclosure, as another option, the network node device may be switched into the dynamic TDD capable mode to support multiple dynamic TDD configurations, after the base station sends MSG4 in block S340. In the switching procedure, the network node device may also configure the communication device to switch into the dynamic TDD capable mode for example via a RRC signaling. In this embodiment, in block S340, the network node device may send MSG4 according to the TDD configuration in the SIB.

According to embodiments of the present disclosure, each of the multiple dynamic TDD configurations may have uplink subframes that belong to a subset of uplink subframes of TDD configuration in said system information block and downlink subframes that belong to a subset of downlink subframes of the TDD configuration informed via dedicated Radio Resource Control signaling, which has been already assigned to the communication device by the network node device.

Figure 4:
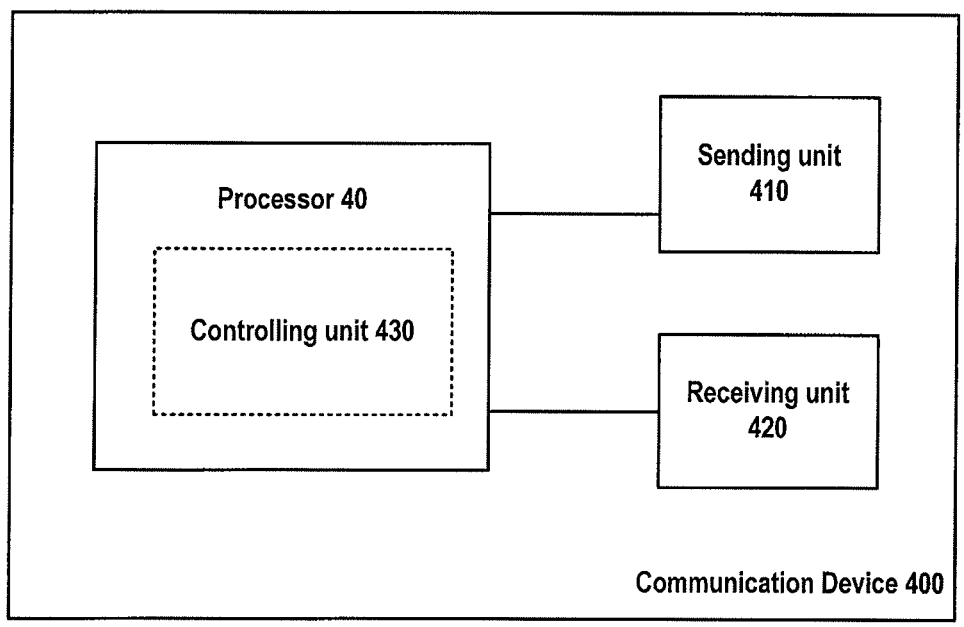
FIG. 4 is a block diagram schematically illustrating a communication device according to one or more embodiments of the present disclosure.

FIG. 4 is a block diagram schematically illustrating a communication device 400 according to one or more embodiments of the present disclosure.

The communication device 400 may be currently in an out of sync or link-failure status and needs to initiate a random access procedure with a network node device such as eNodeB. The communication device may have been assigned more than one TDD configurations before the initiation of the random access procedure. Those previously assigned TDD configurations may include the TDD configuration in the SIB and at least another TDD configuration informed via dedicated Radio Resource Control signaling.

As shown in FIG. 4, the communication device 400 such as the communication device 110 as shown in FIGS. 1A and 1B comprises a sending unit 410 and a receiving unit 420 for communicating with a network node device such as the eNodeB 120 as shown in FIGS. 1A and 1B. The sending unit 410 and the receiving unit 420 may comprise any suitable hardware components for bidirectional wireless communications with the network node device. For example, the sending unit 410 and the receiving unit 420 may be implemented as a suitable radio frequency transceiver (i.e., transmitter and receiver, which may be implemented as a unitary component or separate) for bidirectional wireless communications with the network node device via one or more antennas (not shown in FIG. 4).

The communication device 400 further comprises a processor 40, which includes one or more microprocessor or microcontrollers, as well as other digital hardware, which may include digital signal processors (DSPs), special-purpose digital logic, and the like. The processor 40 may be configured to execute program code stored in memory (not shown in FIG. 4), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The sending unit 410 is configured to send to a network node device a first message (MSG1) including a random access preamble according to the TDD configuration in the SIB.

The receiving unit 420 is configured to receive from the network node device a second message (MSG2) including a random access response using the random access preamble according to the TDD configuration in the SIB. In a contention-free random access procedure, the UE 400 can be thereby aligned with the network node device in the time domain by receiving the random access response.

According to one or more embodiments regarding a contention based random access procedure, the sending unit 410 may be further configured to, in a contention-based random access procedure, send to the network node device a third message (MSG3) including an identifier specific to the communication device 400 according to the TDD configuration in the SIB.

According to an embodiment of the present disclosure, a functional aspect of the processor 40 may comprise a controlling unit 430 configured to switch the communication device into a dynamic TDD capable mode to support multiple dynamic TDD configurations after the communication device 400 sends MSG3. In this embodiment, the receiving unit 420 may be configured to receive from the network node device a fourth message (MSG4) including a contention resolution by monitoring downlink channels according to the multiple dynamic TDD configurations.

According to another embodiment of the present disclosure, the receiving unit 420 may be further configured to receive from the network node device a fourth message (MSG4) including a contention resolution according to the TDD configuration in the SIB. In this embodiment, the controlling unit 430 may be configured to switch the communication device into a dynamic TDD capable mode to support multiple dynamic TDD configurations after MSG4 is received.

According to embodiments of the present disclosure, each of the multiple dynamic TDD configurations may have uplink subframes that belong to a subset of uplink subframes of TDD configuration in said system information block and downlink subframes that belong to a subset of downlink subframes of the TDD configuration informed via dedicated Radio Resource Control signaling, which has been already assigned to the communication device by the network node device.

Figure 5:
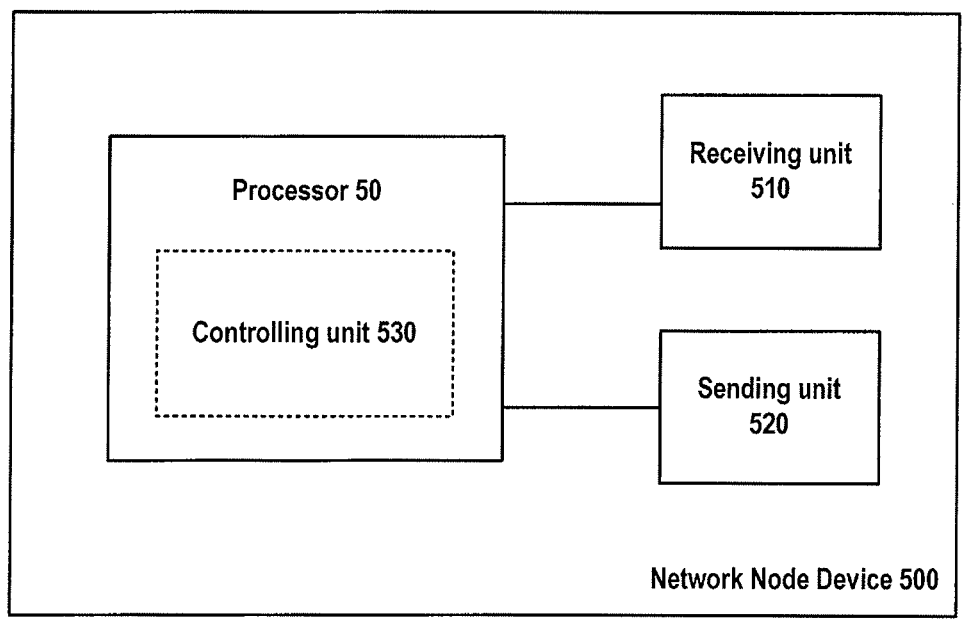
FIG. 5 is a block diagram schematically illustrating a network node device according to one or more embodiments of the present disclosure.

FIG. 5 is a block diagram schematically illustrating a network node device 500 according to one or more embodiments of the present disclosure.

As shown in FIG. 5, the network node device 500 such as the eNodeB 120 as shown in FIGS. 1A and 1B comprises a receiving unit 510 and a sending unit 520 for communicating with a communication device such as the UE 110 as shown in FIGS. 1A and 1B. The communication device may be out of sync or experience a link failure, so it needs to initiate a random access procedure with the network node device such as eNodeB. The network node device 500 may have assigned to the communication device more than one TDD configurations before the initiation of the random access procedure. Those previously assigned TDD configurations may include the TDD configuration in the SIB and at least another TDD configuration informed via dedicated Radio Resource Control signaling. The receiving unit 510 and the sending unit 520 may comprise any suitable hardware components for bidirectional wireless communications with one or more communication devices. For example, the receiving unit 510 and the sending unit 520 may be implemented as a suitable radio frequency transceiver (i.e., transmitter and receiver, which may be implemented as a unitary component or separate) for bidirectional wireless communications with one or more communications via one or more antennas (not shown in FIG. 5).

The network node device 500 further comprises a processor 50, which includes one or more microprocessor or microcontrollers, as well as other digital hardware, which may include digital signal processors (DSPs), special-purpose digital logic, and the like. The processor 50 may be configured to execute program code stored in memory (not shown in FIG. 5), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The receiving unit 510 is configured to receive from a communication device a first message (MSG1) including a random access preamble according to a TDD configuration in a SIB.

The sending unit 520 is configured to send to the communication device a second message (MSG2) including a random access response using the random access preamble according to the TDD configuration in the SIB. In a contention-free random access procedure, the network node device 500 can be thereby aligned with the communication device in the time domain when the UE receives the random access response.

According to one or more embodiments regarding a contention based random access procedure, the receiving unit 510 may be further configured, in a contention-based random access procedure, to receive from the communication device a third message (MSG3) including an identifier specific to the communication device according to the TDD configuration in the SIB.

According to an embodiment of the present disclosure, a functional aspect of the processor 50 may comprise a controlling unit 530 configured to switch the network node device into a dynamic TDD capable mode to support multiple dynamic TDD configurations after the network node device 500 receives MSG3. In this embodiment, the sending unit 520 may be further configured to send to the communication device a fourth message (MSG4) including a contention resolution according to one of the multiple dynamic TDD configurations.

According to another embodiment of the present disclosure, the sending unit 520 may be further configured to send to the communication device a fourth message (MSG4) including a contention resolution according to the TDD configuration in the SIB. The controlling unit 530 may be configured to switch the network node device 500 into a dynamic TDD capable mode to support multiple dynamic TDD configurations after sending MSG4.

According to embodiments of the present disclosure, each of the multiple dynamic TDD configurations may have uplink subframes that belong to a subset of uplink subframes of TDD configuration in said system information block and downlink subframes that belong to a subset of downlink subframes of the TDD configuration informed via dedicated Radio Resource Control signaling, which has been already assigned to the communication device by the network node device.

In a general case of Solution 1, all messages received on a common search space may follow the timing given by the TDD configuration in the SIB. As an example, during the procedure of switching the communication device into the dynamic TDD capable mode as shown in FIGS. 2 and 3, the communication device may be configured by a RRC signaling from the network node device. The communication device is scheduled for uplink traffic on the common search space and follows the TDD configuration in the SIB, until the network node device has received a confirm-message (such as RRC Reconfiguration Complete) from the communication device to indicate that it is switching into the dynamic TDD capable mode. In an implementation, the network node device's feedback timing for downlink scheduling, which is on common search space (i.e., at least for subframes that are downlink or special subframe according to TDD configuration in SIB), also follows the TDD configuration in the SIB. After a RRC reconfiguration message, which may for example instruct the communication device switching into dynamic TDD capable mode, the network node device may follow the timing associated with the dynamic TDD configuration in scheduling received on the communication device specific search space. In another implementation, the RNTI by with the Downlink Control Information (DCI) is scrambled or the DCI format may also be used to indicate the TDD configuration to apply for UL transmission.

Those skilled in the art can appreciate that the various embodiments according to Solution 1 of the present disclosure may also be implemented in the handover case where the communication device is handed over from a source cell served by a source network node device to a cell served by a target network node device. During handover preparation, the target network node device may inform the source network node device of the TDD configuration in the SIB of the target cell via a RRC signaling MobilityControlInfo. Then, the TDD configuration in the SIB of the target cell may be signaled to the communication device by the source network node device during handover execution. Based on the received TDD configuration in SIB of the target cell, the communication device may be operable to perform a random access procedure in the target cell as described above in conjunction with FIG. 2.

Note that the configuration in SIB herein is used as a general term for the configuration that a legacy user would apply in the cell, and this information may be acquired through reading SIB, if present, or by other signaling such as RadioResourceConfigCommonSCell or other RRC signaling for example in handover or carrier aggregation scenario.

According to one or more embodiments of Solution 1 of the present disclosure, when a communication device initiates a random access procedure in the dynamic TDD scenario, the communication device and corresponding network node device such as eNodeB can use consistent TDD configuration in the SIB to perform messaging for a random access procedure. As such, TDD configuration ambiguity between the network node device and the communication device can be eliminated. In these approaches, random access failure of out-of-sync or link-failure communication devices in the dynamic TDD scenario can be significantly reduced.

Solution 2

In various embodiments of Solution 2, an explicit signaling can be used to carry a TDD configuration that eNodeB wants a communication device to use. This information can be used by an out-of-sync communication device when initiating a random access procedure. As an out-of-sync communication device is still in connected mode, it can be either inactive time or in sleep time when the explicit signaling is transmitted from eNodeB. Therefore, a communication device inactive time may detect the explicit signaling and thus know the TDD configuration to be used by the eNodeB in the random access procedure, while a communication device in sleep time cannot know the TDD configuration to be used at all. Therefore, the two different situations should be handled differently. According to one or more embodiments of the present disclosure, an out-of-sync communication device who does not detect the TDD configuration informed by eNodeB in the explicit signaling can use the TDD configuration in the SIB to perform random access procedure, while an out-of-sync communication device who detect the TDD configuration informed by eNodeB in the explicit signaling can use the TDD configuration in the explicit signaling to perform random access procedure.

With reference to FIGS. 6-9, various embodiments of solution 2 of the present disclosure are described in detail.

Figure 6:
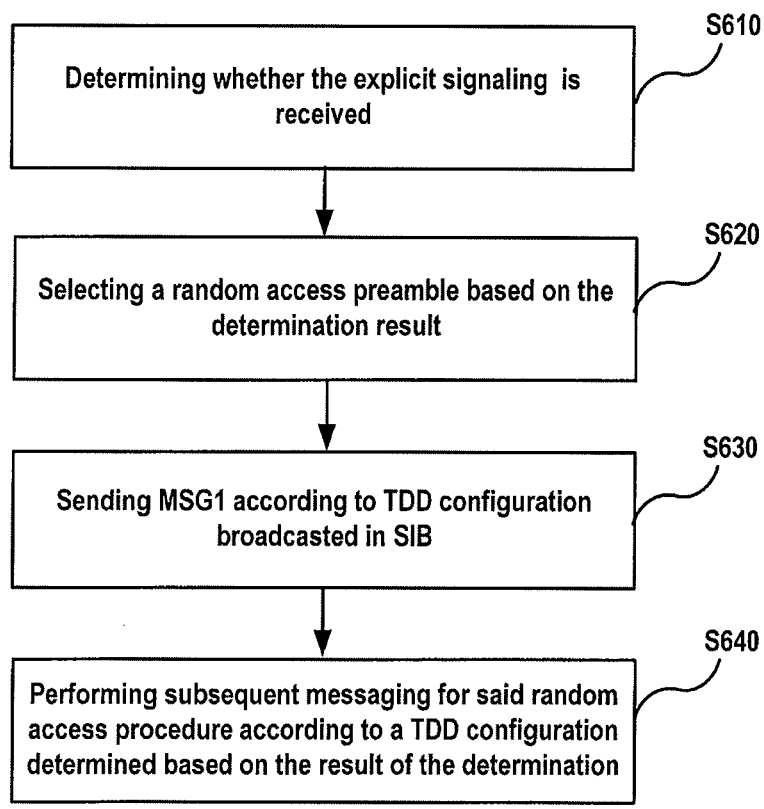
FIG. 6 schematically illustrates an exemplary flow chart of a method for operating a communication device according to one or more embodiments of the present disclosure.

FIG. 6 schematically illustrates an exemplary flow chart of a method (600) for random access in an out-of-sync communication device according to one or more embodiments of the present disclosure.

As shown in FIG. 6, in block S610, the communication device such as the communication device 110 as shown in FIGS. 1A and 1B determines whether an explicit signaling indicative of a TDD configuration is received. The communication device may be configured to receive the explicit signaling from a network node device such as the eNodeB 120 as shown in FIGS. 1A and 1B. When the out-of-sync communication device is in a sleep time, the communication device may miss the explicit signaling.

In block S620, the communication device selects a random access preamble based on a determination result of block S610.

According to one or more embodiments, in a contention-based random access procedure, the communication device may select a random access preamble which belongs to a predefined subset of available random access preambles in a cell served by the network node device, in response to determining in block S610 that the explicit signaling is received. In response to determining in block S610 that the explicit signaling is not received, the communication device may select a random access preamble which does not belong to the predefined subset of available random access preambles in the cell. Since the network node device also has the knowledge of the predefined subset of preambles, the communication device is able to inform the network node device of whether the explicit signaling is received by using the selected preamble.

In block S630, the communication device sends to the network node device a first message (MSG1) for a random access procedure including the random access preamble selected in block S620, according to the TDD configuration in the SIB.

In block S640, the communication device performs subsequent messaging for the random access procedure according to a TDD configuration determined based on the result of the determination. Herein, "subsequent messaging" refers to receiving or sending messages for the random access procedure after MSG1, including but not limited to MSG2/3/4 shown in FIG. 1A and FIG. 1B.

According to one or more embodiment of the present disclosure, the communication device may perform subsequent messaging for the random access procedure according to the TDD configuration indicated by the explicit signaling, in response to determining in block S610 that the explicit signaling is received. In a contention-based random access procedure, the communication device may use the TDD configuration indicated by the explicit signaling to transmit or receive MSG2/MSG3/MSG4 to or from the network node device. In response to determining in block S610 that the explicit signaling is not received, the communication device may perform subsequent messaging for the random access procedure according to the TDD configuration in the SIB. In a contention-based random access procedure, the communication device may use the TDD configuration in the SIB to transmit or receive MSG2/MSG3/MSG4 to or from the network node device.

According to one or more embodiments of the present disclosure, in a contention-free random access procedure, the explicit signaling may be configured to be transmitted with a random access preamble assigned to the communication device in the same message, for example, MSG0. In those embodiments of the present disclosure, if the communication device determines in block S610 that the explicit signaling is received, the communication device may select in block 620 the random access preamble assigned to the out-of-sync communication device to inform the network node device that the explicit signaling has been received by the communication device. Then, the communication device may perform subsequent messaging for the random access procedure according to the TDD configuration indicated by the explicit signaling, i.e., receiving a random access response by monitoring the downlink channel according to the TDD configuration indicated by the explicit signaling.

In some embodiments, in case that the communication device does not receive the explicit signaling, the communication device also misses the preamble assignment transmitted from the network node device for the contention-free random access procedure and fails to access the network.

Figure 7:
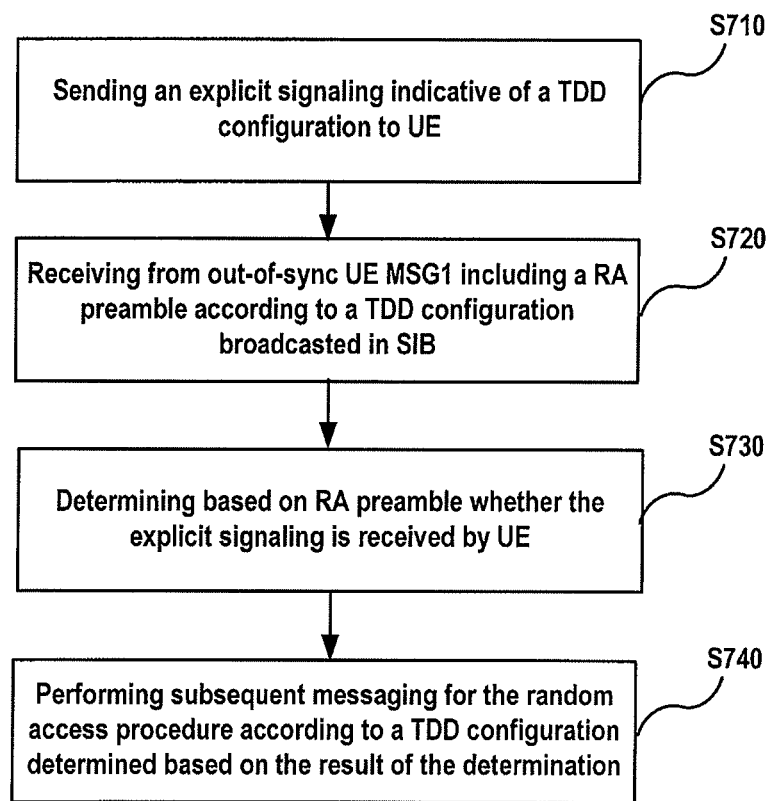
FIG. 7 schematically illustrates an exemplary flow chart of a method for operating a network node device according to one or more embodiments of the present disclosure.

FIG. 7 schematically illustrates an exemplary flow chart of a method 700 for random access in a network node device according to one or more embodiments of the present disclosure.

As shown in FIG. 7, in block S710, the network node device such as the eNodeB 120 as shown in FIGS. 1A and 1B sends to an out-of-sync communication device an explicit signaling indicative of a TDD configuration to be used e.g. in a random access procedure.

In block S720, the network node device receives from the out-of-sync communication device a first message (MSG1) for a random access procedure including a random access preamble according to a TDD configuration in the SIB.

In block S730, the network node device determines, based on the received random access preamble, whether the explicit signaling is received by the out-of-sync communication device.

According to one or more embodiments of the present disclosure, in a contention-based random access procedure, the network node device may determine that the explicit signaling is received by the out-of-sync communication device, if the received random access preamble belongs to a predefined subset of available random access preambles in a cell served by the network node device; and that the explicit signaling is not received by the out-of-sync communication device, if the random access preamble does not belong to the predefined subset of available random access preambles in the cell.

In block S740, the network node device performs subsequent messaging for the random access procedure according to a TDD configuration determined based on the result of the determination in block S730.

According to one or more embodiments of the present disclosure, the network node device perform, in response to determining in block S730 that the explicit signaling is received by the out-of-sync communication device, subsequent messaging for the random access procedure according to the TDD configuration indicated by the explicit signaling. In a contention-based random access procedure, the network node device may use the TDD configuration in the explicit signaling to transmit or receive MSG2/MSG3/MSG4 to or from the communication device. In response to determining in block S730 that the explicit signaling is not received by the out-of-sync communication device, the network node device may perform subsequent messaging for the random access procedure according to the TDD configuration in the SIB. In a contention-based random access procedure, the network node device may use the TDD configuration in the SIB to transmit or receive MSG2/MSG3/MSG4 to or from the communication device.

According to one or more embodiments of the present disclosure, in a contention-free random access procedure, the explicit signaling may be configured to be transmitted with a random access preamble assigned to the out-of-sync communication device in a same message, for example, MSG0. In those embodiments, the network node device may determine in block S730 that the explicit signaling is received by the out-of-sync communication device, if the received random access preamble is the random access preamble assigned to the out-of-sync communication device. In response to determining that the explicit signaling is received by the out-of-sync communication device, the network node device may perform subsequent messaging for the random access procedure according to the TDD configuration indicated by the explicit signaling, i.e, sending a random access response according to the TDD configuration indicated by the explicit signaling.

In those embodiments, in case that the communication device does not receive the explicit signaling, the communication device also misses the preamble assignment transmitted from the network node' device for the contention-free random access procedure and fails to access the network.

Figure 8:
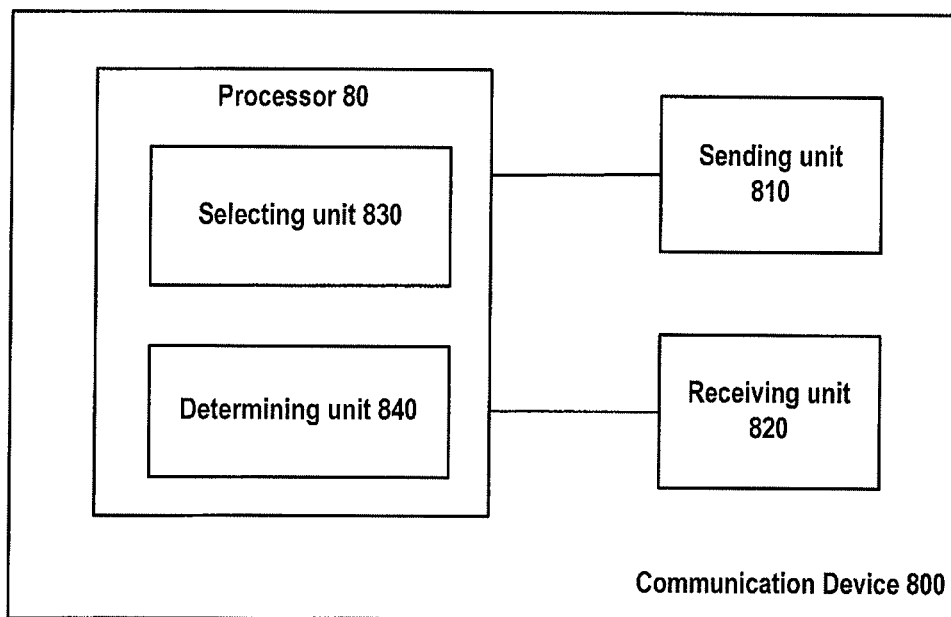
FIG. 8 is a block diagram schematically illustrating a communication device according to one or more embodiments of the present disclosure.

FIG. 8 is a block diagram schematically illustrating a communication device 800 according to one or more embodiments of the present disclosure.

As shown in FIG. 8, the communication device 800 such as the UE 110 as shown in FIGS. 1A and 1B comprises a sending unit 810 and a receiving unit 820 for communicating with a network node device such as the eNodeB 120 as shown in FIGS. 1A and 1B. The sending unit 810 and the receiving unit 820 may comprise any suitable hardware components for bidirectional wireless communications with the network device. For example, the sending unit 810 and the receiving unit 820 may be implemented as a suitable radio frequency transceiver (i.e., transmitter and receiver, which may be implemented as a unitary component or separate) for bidirectional wireless communications with the network node device via one or more antennas (not shown in FIG. 8).

The receiving unit 820 may be configured to receive an explicit signaling indicative of a TDD configuration, when the communication device 800 is in an active time.

The network node device 800 further comprises a processor 80, which includes one or more microprocessor or microcontrollers, as well as other digital hardware, which may include digital signal processors (DSPs), special-purpose digital logic, and the like. The processor 80 may be configured to execute program code stored in memory (not shown in FIG. 8), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

According to an embodiment of the present disclosure, a functional aspect of the processor 80 may comprise a selecting unit 830 and a determining unit 840. The determining unit 840 is configured to determine whether an explicit signaling indicative of a TDD configuration is received by the receiving unit. The selecting unit 830 is configured to select a random access preamble based on the determination result of the determining unit 840.

The sending unit 810 is configured to send to a network node device a first message (MSG1) for a random access procedure including the random access preamble selected by the selecting unit 830, according to a TDD configuration in the SIB.

The sending unit 810 and the receiving unit 820 are further configured to perform subsequent messaging for the random access procedure according to a TDD configuration determined based on the determination result of the determining unit 840.

According to one or more embodiments of the present disclosure, in a contention-based random access procedure, the selecting unit 830 may be configured to select a random access preamble which belongs to a predefined subset of available random access preambles in a cell served by the network node device, in response to determining that the explicit signaling is received by the receiving unit 820. In response to determining that the explicit signaling is not received by the receiving unit 820, the selecting unit 830 may be configured to select a random access preamble which does not belong to the predefined subset of available random access preambles in the cell. Since the network node device also has the knowledge of the predefined subset of preambles, the communication device 800 is able to inform the network node device of whether the explicit signaling is received by using the selected preamble.

According to one or more embodiments of the present disclosure, in a contention-based random access procedure, the sending unit 810 and the receiving unit 820 may be configured to perform, in response to determining that the explicit signaling is received by the receiving unit 820, subsequent messaging for the random access procedure according to the TDD configuration indicated by the explicit signaling. As such, the sending unit 810 and the receiving unit 820 may be configured to receive or transmit MSG2/MSG3/MSG4 from or to the network node device by using the TDD configuration indicated by the explicit signaling. In response to determining that the explicit signaling is not received by the receiving unit 820, the sending unit 810 and the receiving unit 820 may be configured to perform subsequent messaging for the random access procedure according to the TDD configuration in the SIB. As such, the sending unit 810 and the receiving unit 820 may be configured to receive or transmit MSG2/MSG3/MSG4 from or to the network node device by using the TDD configuration in the SIB.

According to one or more embodiments of the present disclosure, in a contention-free random access procedure, the explicit signaling may be configured to be transmitted with a random access preamble assigned to the communication device in the same message, for example, MSG0. In those embodiments of the present disclosure, if the determining unit 840 determines that the explicit signaling is received by the receiving unit 820, the selecting unit 830 may be configured to select the random access preamble assigned to the out-of-sync communication device, to inform the network node device that the explicit signaling has been received by the communication device. Then, the sending unit 810 and the receiving unit 820 may be configured to perform subsequent messaging for the random access procedure according to the TDD configuration indicated by the explicit signaling, i.e., receiving a random access response by monitoring the downlink channel according to the TDD configuration indicated by the explicit signaling.

In those embodiments, in case that the communication device does not receive the explicit signaling, the communication device will also miss the preamble assignment transmitted from the network node device for the contention-free random access procedure and fails to access the network.

Figure 9:
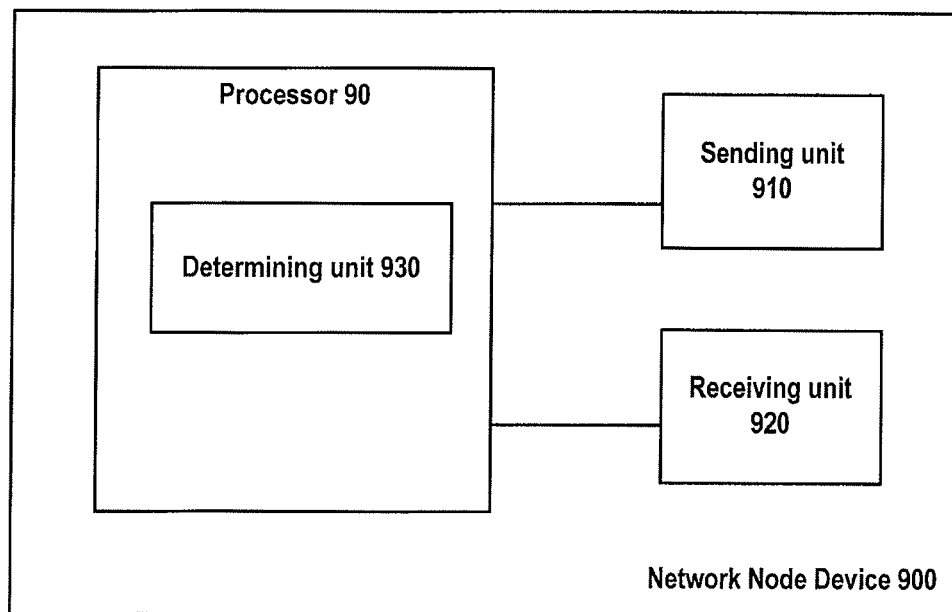
FIG. 9 is a block diagram schematically illustrating a network node device according to one or more embodiments of the present disclosure.

FIG. 9 is a block diagram schematically illustrating a network node device 900 according to one or more embodiments of the present disclosure.

As shown in FIG. 9, the network node device 900 such as the eNodeB 120 as shown in FIGS. 1A and 1B comprises a sending unit 910 and a receiving unit 920 for communicating with communication devices such as the UE 110 as shown in FIGS. 1A and 1B. The sending unit 910 and the receiving unit 920 may comprise any suitable hardware components for bidirectional wireless communications with one or more communication devices. For example, the sending unit 910 and the receiving unit 920 may be implemented as a suitable radio frequency transceiver (i.e., transmitter and receiver, which may be implemented as a unitary component or separate) for bidirectional wireless communications with one or more communications via one or more antennas (not shown in FIG. 9).

The sending unit 910 is configured to send to an out-of-sync communication device an explicit signaling indicative of a TDD configuration.

The receiving unit 920 is configured to receive from the out-of-sync communication device a first message (MSG1) for a random access procedure including a random access preamble according to a TDD configuration in the SIB.

The network node device 900 further comprises a processor 90, which includes one or more microprocessor or microcontrollers, as well as other digital hardware, which may include digital signal processors (DSPs), special-purpose digital logic, and the like. The processor 90 may be configured to execute program code stored in memory (not shown in FIG. 9), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

According to an embodiment of the present disclosure, a functional aspect of the processor 90 may comprise a determining unit 930 configured to determine, based on the random access preamble received by the receiving unit 920, whether the explicit signaling is received by the out-of-sync communication device.

The sending unit 910 and the receiving unit 920 are configured to perform subsequent messaging for the random access procedure according to a TDD configuration determined based on the determination result of the determining unit 930.

According to one or more embodiments of the present disclosure, in a contention-based random access procedure, the determining unit 930 may be configured to determine that the explicit signaling is received by the out-of-sync communication device, if the random access preamble received by the receiving unit 920 belongs to a predefined subset of available random access preambles in a cell. If the random access preamble does not belong to the predefined subset of available random access preambles in the cell, the determining unit 930 may be configured to determine that the explicit signaling is not received by the out-of-sync communication device.

According to one or more embodiments of the present disclosure, in response to determining that the explicit signaling is received by the out-of-sync communication device, the sending unit 910 and the receiving unit 920 may be configured to perform subsequent messaging for the random access procedure according to the TDD configuration indicated by the explicit signaling. In a contention-based random access procedure, the sending unit 910 and the receiving unit 920 may transmit or receive MSG2/MSG3/MSG4 to or from the communication device by using the TDD configuration in the explicit signaling. In response to determining that the explicit signaling is not received by the out-of-sync communication device, the sending unit 910 and the receiving unit 920 may be configured to perform subsequent messaging for the random access procedure according to the TDD configuration in the SIB. In a contention-based random access procedure, the sending unit 910 and the receiving unit 920 may transmit or receive MSG2/MSG3/MSG4 to or from the communication device by using the TDD configuration in the SIB.

According to one or more embodiments of the present disclosure, in a contention-free random access procedure, the explicit signaling may be configured to be transmitted with a random access preamble assigned to the out-of-sync communication device in the same message (e.g., MSG0). The determining unit 930 may be configured to determine that the explicit signaling is received by the out-of-sync communication device, if the random access preamble is the random access preamble assigned to the out-of-sync communication device. In response to determining that the explicit signaling is received by the out-of-sync communication device, the sending unit 910 and the receiving unit 920 may be configured to perform subsequent messaging for the random access procedure according to the TDD configuration indicated by the explicit signaling, i.e., sending a random access response according to the TDD configuration in the explicit signaling.

In those embodiments, in case that the communication device does not receive the explicit signaling, the communication device will also miss the preamble assignment transmitted from the network node device for the contention-free random access procedure and the random access will be failed. According to one or more embodiments of the present disclosure, when a communication device initiates a random access procedure in the dynamic TDD scenario, the communication device and corresponding network node device such as eNodeB can use consistent TDD configuration in the SIB or the explicit signaling to perform messaging for a random access procedure. In these approaches, random access failure of out-of-sync communication devices in the dynamic TDD scenario can be significantly reduced.

Solution 3 for Carrier Aggregation (CA)

In the case of applying CA, a communication device may communicate over one Primary Cell (PCell) and one or more Secondary Cell (SCell), both of which constitute a serving cell set for the communication device. The Component Carriers (CCs) of the PCell and Scell(s) aggregated for the communication device are normally from a same network node device such as eNodeB and those CCs are synchronized with one another. The communication device may be configured to support the dynamic TDD capable mode in the PCell and SCell(s) separately and independently.

The network node device such as eNodeB may instruct the communication device via a RRC signaling such as RRCConnectionReconfiguration to enable the dynamic TDD capable mode in the SCell(s) Upon receipt of the RRC signaling instructed by the network node device, the communication device needs to inform the network node device that it enables the dynamic TDD capable mode in their communications over the SCell(s). As soon as the network node device has received the confirmation of the communication device, it communicates with the communication device over the SCell(s) in the dynamic TDD capable mode. At the side of the communication device, before it is aware that the network node device has received its confirmation, it communicates with the network node device in the SCell(s) according to the TDD configuration in the SIB.

However, before the dynamic TDD capable mode is enabled in the SCell(s), there is TDD configuration ambiguity for the message exchange between the network node device and the communication device, as the communication device may have been assigned more than one TDD configuration previously. In solution 3 of the present disclosure, similar with solution 1, the TDD configuration in the SIB broadcasted by the network node device may be selected and used to perform the signaling exchange between the network node device and the communication device before the dynamic TDD communication is established.

With reference to FIGS. 10-13, various embodiments of solution 3 of the present disclosure are described in detail.

Figure 10:
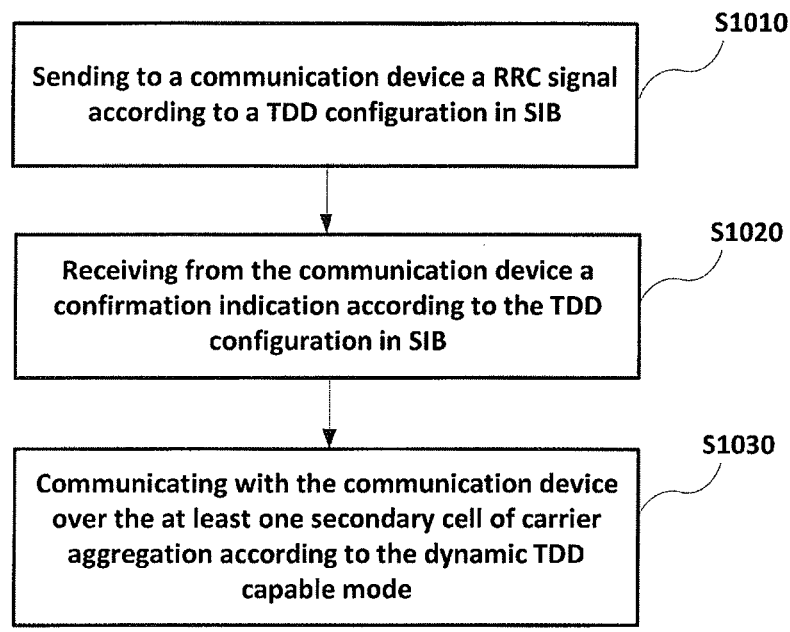
FIG. 10 schematically illustrates an exemplary flow chart of a method for operating a communication device according to one or more embodiments of the present disclosure.

FIG. 10 schematically illustrates an exemplary flow chart of a method 1000 for operating a network node device according to one or more embodiments of the present disclosure.

As shown in FIG. 10, in step S1010, the network node device, such as eNodeB, which serves the communication device over at least one secondary cell in carrier aggregation, sends to the communication device a RRC signaling according to a TDD configuration in SIB, so as to instruct the communication device to enable the dynamic TDD capable mode.

In step S1020, the network node device receives from the communication device a confirmation indication according to the TDD configuration in the SIB, that the communication device has received the RRC signaling.

In step S1030, the network node device is controlled to communicate with the communication device over the SCell(s) according to the dynamic TDD capable mode, so as to support multiple dynamic TDD configurations.

The network node device may use an implicit signaling to inform the communication device that it has received the confirmation indication from the communication device, so that the communication device may be aware that the network node device has been switched into the dynamic TDD capable mode in their communications over the SCell(s).

Figure 11:
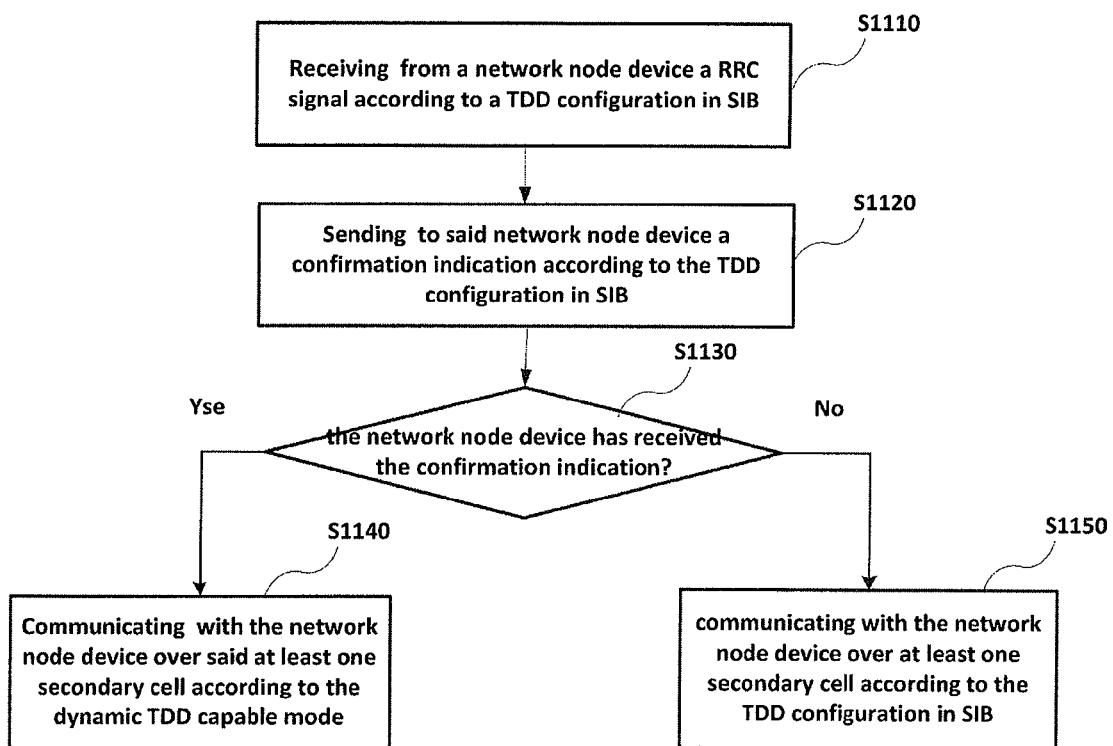
FIG. 11 schematically illustrates an exemplary flow chart of a method for operating a network node device according to one or more embodiments of the present disclosure.

FIG. 11 schematically illustrates an exemplary flow chart of a method 1100 for operating a communication device according to one or more embodiments of the present disclosure.

As shown in FIG. 11, in step S1110, the communication device, such as UE, which is served by a network node device over at least one secondary cell in carrier aggregation, receives from the network node device a RRC signaling according to a TDD configuration in SIB. The RRC signaling is used to instruct the communication device to enable the dynamic TDD capable mode.

In step S1120, the communication device sends to the network node device a confirmation indication according to the TDD configuration in the SIB, to indicate that it has received the RRC signaling.

In step S1130, it is determined whether the network node device has received the confirmation indication or not.

According to an embodiment of the present disclosure, the communication device may perform the determination based on whether its scheduling information is detected on a UE-specific search space or a common search space. If the scheduling information from the network node device is detected in the UE-specific search space, then it is determined that the network node device has received the confirmation indication and has switched into the dynamic TDD capable mode; if the scheduling information from the network node device is detected in the common search space, then it is determined that the network node device has not received the confirmation indication and has not switched into the dynamic TDD capable mode yet.

According to an embodiment of the present disclosure, the communication device may perform the determination based on Radio Network Temporary Identity (RNTI) sent by the network node device on a control channel, for example, Physical Downlink Control Channel (PDCCH). The network node device may use RNTI as an implicit signaling to indicate whether it has received the confirmation indication from the communication device and has switched into the dynamic TDD capable mode. For example, a RNTI may be selected to indicate that the network node device receives the confirmation indication, while another different RNTI may be selected to indicate that the network node device does not receive the confirmation indication.

According to an embodiment of the present disclosure, the communication device may perform the determination based on the DCI format sent by the network node device on a control channel. The network node device may use the DCI format as an implicit signaling to indicate whether it has received the confirmation indication from the communication device and has switched into the dynamic TDD capable mode. For example, a DCI format may be selected to indicate that the network node device receives the confirmation indication, while another different DCI format may be selected to indicate that the network node device does not receive the confirmation indication.

In step S1140, in response to determining that the network node device has received the confirmation indication, the communication device communicates with the network node device according to the dynamic TDD capable mode, so as to support multiple dynamic TDD configurations.

In step S1150, in response to determining that the network node device has not received the confirmation indication, the communication device communicates with the network node device according to the TDD configuration in the SIB.

Figure 12:
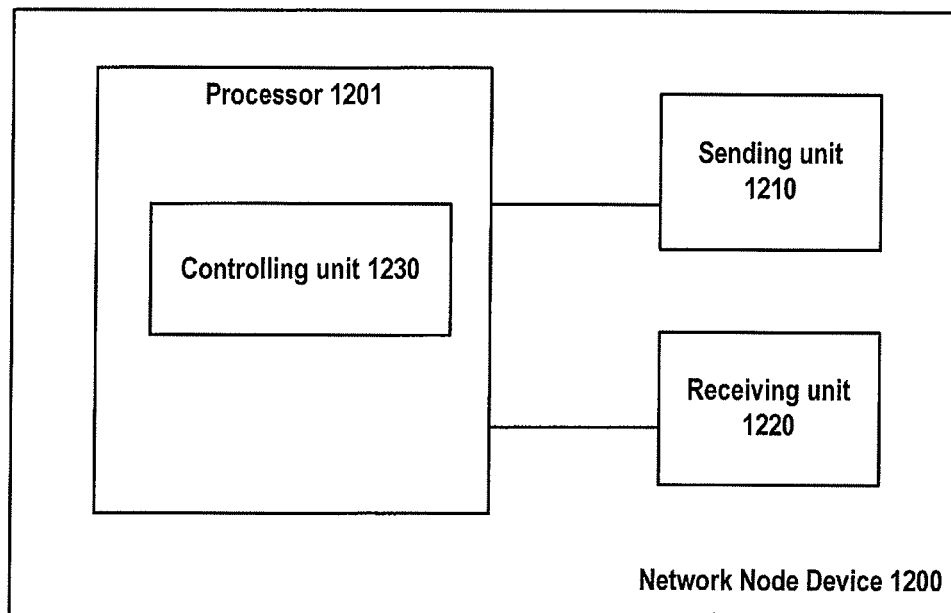
FIG. 12 is a block diagram schematically illustrating a communication device according to one or more embodiments of the present disclosure.

FIG. 12 is a block diagram schematically illustrating a network node device 1200 according to one or more embodiments of the present disclosure.

As shown in FIG. 12, the network node device 1200, which serves a communication device over at least one secondary cell in carrier aggregation, comprises a sending unit 1210 and a receiving unit 1220. The sending unit 1210 and the receiving unit 1220 may comprise any suitable hardware components for bidirectional wireless communications with one or more communication devices. For example, the sending unit 1210 and the receiving unit 1220 may be implemented as a suitable radio frequency transceiver (i.e., transmitter and receiver, which may be implemented as a unitary component or separate) for bidirectional wireless communications with one or more communications via one or more antennas (not shown in FIG. 12).

The sending unit 1210 is configured to send to the communication device a RRC signaling according to a TDD configuration in SIB, so as to instruct the communication device to enable the dynamic TDD capable mode.

The receiving unit 1220 is configured to receive from the communication device a confirmation indication according to the TDD configuration in the SIB, that it enables the dynamic TDD capable mode.

The network node device 1200 further comprises a processor 1201, which includes one or more microprocessor or microcontrollers, as well as other digital hardware, which may include digital signal processors (DSPs), special-purpose digital logic, and the like. The processor 90 may be configured to execute program code stored in memory (not shown in FIG. 12), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

According to an embodiment of the present disclosure, a functional aspect of the processor 1201 may comprise a controlling unit 1230. The controlling unit 1230 is configured to control the sending unit 1210 and the receiving unit 1220 of the network node device 1200 to communicate with the communication device according to the dynamic TDD capable mode, so as to support multiple dynamic TDD configurations.

The controlling unit 1230 of the network node device 1200 may control the sending unit 1210 to use an implicit signaling to inform the communication device that it has received the confirmation indication from the communication device and switched into the dynamic TDD capable mode.

Figure 13:
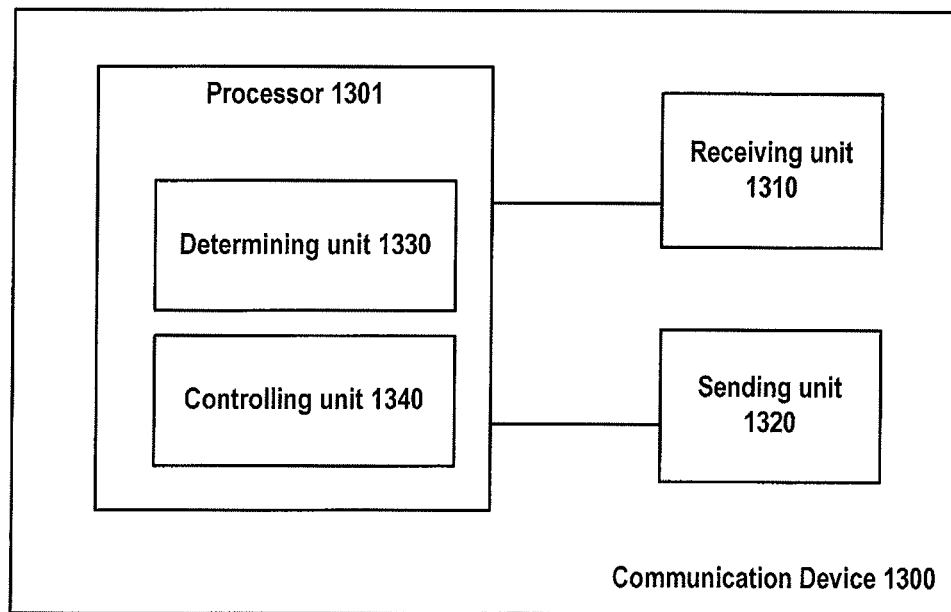
FIG. 13 is a block diagram schematically illustrating a network node device according to one or more embodiments of the present disclosure.

FIG. 13 is a block diagram schematically illustrating a communication device 1300 according to one or more embodiments of the present disclosure.

As shown in FIG. 13, the communication device 1300, which is served by a network node device over at least one secondary cell in carrier aggregation, comprises a receiving unit 1310 and a sending unit 1320. The receiving unit 1310 and the sending unit 1320 may comprise any suitable hardware components for bidirectional wireless communications with one or more communication devices. For example, receiving unit 1310 and the sending unit 1320 may be implemented as a suitable radio frequency transceiver (i.e., transmitter and receiver, which may be implemented as a unitary component or separate) for bidirectional wireless communications with one or more communications via one or more antennas (not shown in FIG. 13).

The receiving unit 1310 is configured to receive from the network node device a RRC signaling according to a TDD configuration in SIB. The RRC signaling is used to instruct the communication device to enable the dynamic TDD capable mode in their communications over the SCell(s).

The sending unit 1320 is configured to send to the network node device a confirmation indication according to the TDD configuration in the SIB, to indicate that it enables the dynamic TDD capable mode in their communications over the SCell(s).

The network node device 1300 further comprises a processor 1301, which includes one or more microprocessor or microcontrollers, as well as other digital hardware, which may include digital signal processors (DSPs), special-purpose digital logic, and the like. The processor 1301 may be configured to execute program code stored in memory (not shown in FIG. 13), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

According to an embodiment of the present disclosure, a functional aspect of the processor 1301 may comprise a determining unit 1330 and a controlling unit 1340.

The determining unit 1330 is configured to determine whether the network node device 1300 has received the confirmation indication or not.

According to an embodiment of the present disclosure, the determining unit 1330 may perform the determination based on whether the scheduling information of the communication device is detected on a UE-specific search space or a common search space. If the scheduling information from the network node device is detected in the UE-specific search space, then the determining unit 1330 may determine that the network node device has received the confirmation indication and has switched into the dynamic TDD capable mode; if the scheduling information from the network node device is detected in the common search space, then the determining unit 1330 may determine that the network node device has not received the confirmation indication and has not switched into the dynamic TDD capable mode yet.

According to an embodiment of the present disclosure, the determining unit 1330 may perform the determination based on Radio Network Temporary Identity (RNTI) sent by the network node device on a control channel, for example, Physical Downlink Control Channel (PDCCH). The network node device may use RNTI as an implicit signaling to indicate whether it has received the confirmation indication from the communication device and has switched into the dynamic TDD capable mode. For example, a RNTI may be selected to indicate that the network node device receives the confirmation indication, while another different RNTI may be selected to indicate that the network node device does not receive the confirmation indication.

According to an embodiment of the present disclosure, the determining unit 1330 may perform the determination based on the DCI format sent by the network node device on a control channel. The network node device may use the DCI format as an implicit signaling to indicate whether it has received the confirmation indication from the communication device and has switched into the dynamic TDD capable mode. For example, a DCI format may be selected to indicate that the network node device receives the confirmation indication, while another different DCI format may be selected to indicate that the network node device does not receive the confirmation indication.

The controlling unit 1340 is configured to control, in response to determining in the determining unit 1330 that the network node device has received the confirmation indication, the receiving unit 1310 and the sending unit 1320 to communicate with the network node device over the SCell(s) according to the dynamic TDD capable mode, so as to support multiple dynamic TDD configurations.

The controlling unit 1340 is configured to control, in response to determining in the determining unit 1330 that the network node device has not received the confirmation indication, the receiving unit 1310 and the sending unit 1320 to communicate with the network node device in the SCell(s) according to the TDD configuration in the SIB.

According to one or more embodiments of the present disclosure, TDD configuration ambiguity can be effectively eliminated for the message exchange between the network node device and the communication device before the dynamic TDD capable mode is enabled in the SCell(s).

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for operating a communication device, comprising:
    sending to a network node device a first message including a random access preamble according to a Time Division Duplex, TDD, configuration in a system information block;
    receiving from said network node device a second message including a random access response using said random access preamble according to said TDD configuration in said system information block;
    in a contention-based random access procedure, sending to said network node device a third message including an identifier specific to said communication device according to said TDD configuration in said system information block;

switching said communication device into a dynamic TDD capable mode to support multiple dynamic TDD configurations; and receiving from said network node device a fourth message including a contention resolution by monitoring downlink channels according to said multiple dynamic TDD configurations.

2. The method according to claim 1, wherein said communication device is assigned more than one TDD configurations before initiating a random access procedure and said more than one TDD configurations include said TDD configuration in said system information block and further include at least another TDD configuration informed via dedicated Radio Resource Control signaling.

3. The method according to claim 1, wherein each of the multiple dynamic TDD configurations has uplink subframes that belong to a subset of uplink subframes of said TDD configuration in said system information block and downlink subframes that belong to a subset of downlink subframes of said another TDD configuration informed via dedicated Radio Resource Control signaling.

4. The method according to claim 1, wherein said communication device is handed over from a source cell served by a source network node device to a target cell served by said network node device, and wherein said TDD configuration in said system information block is informed from said network node device to said source network node device and signaled to said communication device from said source network node device.

5. The method according to claim 1, wherein said method is used for random access.

6. A method for operating a network node device, comprising:

receiving from a communication device a first message including a random access preamble according to a TDD configuration in a system information block;

sending to said communication device a second message including a random access response using said random access preamble according to said TDD configuration in said system information block;

in a contention-based random access procedure, receiving from said communication device a third message including an identifier specific to said communication device according to said TDD configuration in said system information block;

switching said network node device into a dynamic TDD capable mode to support multiple dynamic TDD configurations; and sending to said communication device a fourth message including a contention resolution according to one of the multiple dynamic TDD configurations.

7. The method according to claim 6, wherein said communication device is assigned more than one TDD configurations before a random access procedure and wherein said more than one TDD configurations include said TDD configuration in said system information block and further include at least another TDD configuration informed via dedicated Radio Resource Control signaling.

8. The method according to claim 6, wherein each of the multiple dynamic TDD configurations has uplink subframes that belong to a subset of uplink subframes of said TDD configuration in said system information block and downlink subframes that belong to a subset of downlink subframes of said another TDD configuration informed via dedicated Radio Resource Control signaling.

9. The method according to claim 6, wherein said network node device serves a target cell, to which said communication device is to be handed over from a source cell served by a source network node device, and wherein said TDD configuration in said system information block is informed from said network node device to said source network node device and signaled to said communication device from said source network node device.

10. A communication device, comprising:

a sending unit configured to send to a network node device a first message including a random access preamble according to a Time Division Duplex, TDD, configuration in a system information block;

a receiving unit configured to receive from said network node device a second message including a random access response using said random access preamble according to said TDD configuration in said system information block;

said sending unit is further configured to, in a contention-based random access procedure, send to said network node device a third message including an identifier specific to said communication device according to said TDD configuration in said system information block;

a controlling unit configured to switch said communication device into a dynamic TDD capable mode to support multiple dynamic TDD configurations; and wherein said receiving unit is further configured to receive from the network node device a fourth message including a contention resolution by monitoring downlink channels according to said multiple dynamic TDD configurations.

11. The communication device according to claim 10, wherein said communication device has more than one TDD configurations before initiating a random access procedure and said more than one TDD configurations include said TDD configuration in said system information block and further include at least another TDD configuration informed via dedicated Radio Resource Control signaling.

12. The communication device according to claim 10, wherein each of the multiple dynamic TDD configurations has uplink subframes that belong to a subset of uplink subframes of said TDD configuration in said system information block and downlink subframes that belong to a subset of downlink subframes of said another TDD configuration informed via dedicated Radio Resource Control signaling.

13. The communication device according to claim 10, wherein said communication device is handed over from a source cell served by a source network node device to a target cell served by said network node device, and wherein said TDD configuration in said system information block is informed from said network node device to said source network node device and signaled to said communication device from said source network node device.

14. A network node device, comprising:

a receiving unit configured to receive from a communication device a first message including a random access preamble according to a TDD configuration in a system information block;

a sending unit configured to send to said communication device a second message including a random access response using said random access preamble according to said TDD configuration in said system information block;

said receiving unit is further configured, in a contention-based random access procedure, to receive from said communication device a third message including an identifier specific to said communication device according to said TDD configuration in said system information block;

controlling unit configured to switch said network node device into a dynamic TDD capable mode to support multiple dynamic TDD configurations; and wherein said sending unit is further configured to send to said communication device a fourth message including a contention resolution according to one of the multiple dynamic TDD configurations.

15. The network node device according to claim 14, wherein said network node device is configured to assign said communication device more than one TDD configurations before a random access procedure and wherein said more than one TDD configurations include said TDD configuration in said system information block and further include at least another TDD configuration informed via dedicated Radio Resource Control signaling.

16. The network node device according to claim 14, wherein each of the multiple dynamic TDD configurations has uplink subframes that belong to a subset of uplink subframes of said TDD configuration in said system information block and downlink subframes that belong to a subset of downlink subframes of said another TDD configuration informed via dedicated Radio Resource Control signaling.

17. The network node device according to claim 14, wherein said network node device serves a target cell, to which said communication device is to be handed over from a source cell served by a source network node device, and wherein said TDD configuration in said system information block is informed from said network node device to said source network node device and signaled to said communication device from said source network node device.

* * * * *

UNITED STATES PATENT AND TRADEMARK OFFICE
CERTIFICATE OF CORRECTION

PATENT NO. : 9,621,326 B2  
APPLICATION NO. : 14/387581  
DATED : April 11, 2017  
INVENTOR(S) : Fan et al.

Page 1 of 1

It is certified that error appears in the above-identified patent and that said Letters Patent is hereby corrected as shown below:

On the Title Page

In Item (57), under "ABSTRACT", in Column 2, Line 2, delete "out-of sync" and insert -- out-of-sync --, therefor.

In the Specification

In Column 8, Line 19, delete "on the" and insert -- of the --, therefor.

In Column 8, Line 45, delete "disclosure; and" and insert -- disclosure; --, therefor.

In Column 10, Line 27, delete "MSG 1 Upon" and insert -- MSG 1. Upon --, therefor.

In Column 10, Line 57, delete "radio" and insert -- random --, therefor.

In Columns 11 & 12, Lines 67 & 1, delete "[terminaldevice/communication device]" and insert -- terminaldevice/communicationdevice --, therefor.

In Column 18, Line 1, delete "inactive" and insert -- in active --, therefor.

In Column 18, Line 3, delete "inactive" and insert -- in active --, therefor.

In Column 18, Line 21, delete "method (600)" and insert -- method 600 --, therefor.

In Column 20, Line 33, delete "i.e," and insert -- i.e., --, therefor.

In Column 24, Line 16, delete "SCell(s) Upon" and insert -- SCell(s). Upon --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*